United States Patent
Choi et al.

(10) Patent No.: US 7,073,688 B2
(45) Date of Patent: Jul. 11, 2006

(54) PERSONAL HYDRATION SYSTEM WITH COMPONENT CONNECTIVITY

(75) Inventors: Robert Choi, Rohnert Park, CA (US); Herbert Douglas, Antioch, CA (US); Barley A. Forsman, Cotati, CA (US); Jeremy Galten, Petaluma, CA (US)

(73) Assignee: CamelBak Products, LLC, Petaluma, CA (US)

( * ) Notice: Subject to any disclaimer, the term of this patent is extended or adjusted under 35 U.S.C. 154(b) by 217 days.

(21) Appl. No.: 10/617,879

(22) Filed: Jul. 9, 2003

(65) Prior Publication Data
US 2004/0079775 A1 Apr. 29, 2004

Related U.S. Application Data

(63) Continuation-in-part of application No. 10/267,036, filed on Oct. 7, 2002, now Pat. No. 6,908,015.

(60) Provisional application No. 60/328,260, filed on Oct. 9, 2001.

(51) Int. Cl.
*B67D 5/064* (2006.01)
(52) U.S. Cl. .................. 222/175; 222/105; 222/192; 128/202.5; 141/379; 220/714; 224/148.2
(58) Field of Classification Search .................. 222/92, 222/105, 167, 175, 386.5, 501, 527, 529, 222/531, 537, 548, 610, 192; 128/203.21, 128/202.5; 141/379; 224/148.2; 220/714
See application file for complete search history.

(56) References Cited

U.S. PATENT DOCUMENTS

| | | | |
|---|---|---|---|
| 2,260,712 A | 10/1941 | Harrison | |
| 2,263,293 A * | 11/1941 | Ewald | 251/149.6 |
| 3,731,717 A | 5/1973 | Potash | |
| 4,423,892 A | 1/1984 | Bartholomew | |
| 4,436,125 A | 3/1984 | Blenkush | |
| 4,500,118 A | 2/1985 | Blenkush | |
| 4,541,457 A | 9/1985 | Blenkush | |
| 4,541,657 A | 9/1985 | Smyth | |
| 4,630,847 A | 12/1986 | Blenkush | |

(Continued)

FOREIGN PATENT DOCUMENTS

DE 3727789 3/1988

OTHER PUBLICATIONS

English-language abstract of German Patent No. DE 3727789, esp@cenet database, 1988.

(Continued)

*Primary Examiner*—Gene Mancene
*Assistant Examiner*—Melvin A. Cartagena
(74) *Attorney, Agent, or Firm*—Kolisch Hartwell, P.C.

(57) ABSTRACT

Quick-connect assemblies and hydration systems incorporating the same. The hydration system includes a fluid reservoir and may be housed within a pack. Drink fluid is drawn from the reservoir through a drink tube to a mouthpiece. In some embodiments, the drink tube is connected to the reservoir at an exit port, the hydration system includes a manually actuated on/off valve, a filter, a pump, and/or a bite-actuated mouthpiece. The quick-connect assembly fluidly interconnects components of the hydration system and is configured to quickly release, and permit reattachment of, the detached components or replacement components. In some embodiments, the replacement components enable different performance from the detached components. In some embodiments, the quick-connect assembly is adapted to selectively couple a bite-actuated mouthpiece and a gas mask adapter to the drink tube. In some embodiments, at least a portion, if not the entire, hydration system is formed from a chemically resistant material.

28 Claims, 13 Drawing Sheets

U.S. PATENT DOCUMENTS

| | | | |
|---|---|---|---|
| 4,703,957 A | 11/1987 | Blenkush | |
| 4,712,594 A | 12/1987 | Schneider | |
| 4,804,213 A | 2/1989 | Guest | |
| 4,884,829 A | 12/1989 | Funk et al. | |
| 4,903,995 A | 2/1990 | Blenkush et al. | |
| 4,934,655 A | 6/1990 | Blenkush et al. | |
| 4,946,200 A | 8/1990 | Blenkush et al. | |
| 4,971,048 A | 11/1990 | Seekins | |
| 5,033,777 A | 7/1991 | Blenkush | |
| 5,052,725 A | 10/1991 | Meyer et al. | |
| 5,074,601 A | 12/1991 | Spors et al. | |
| 5,082,721 A | 1/1992 | Smith, Jr. et al. | |
| 5,104,158 A | 4/1992 | Meyer et al. | |
| 5,115,947 A * | 5/1992 | McDonnell et al. | 222/107 |
| 5,178,303 A | 1/1993 | Blenkush et al. | |
| 5,316,041 A | 5/1994 | Ramacier, Jr. et al. | |
| H1361 H | 10/1994 | Tardiff, Jr. et al. | |
| 5,353,836 A | 10/1994 | deCler et al. | |
| 5,356,183 A * | 10/1994 | Cole | 285/305 |
| 5,374,088 A | 12/1994 | Moretti et al. | |
| 5,378,024 A | 1/1995 | Kumagai et al. | |
| D357,307 S | 4/1995 | Ramacier, Jr. et al. | |
| 5,494,074 A | 2/1996 | Ramacier, Jr. et al. | |
| 5,520,420 A | 5/1996 | Moretti | |
| 5,536,047 A | 7/1996 | Detable et al. | |
| 5,639,064 A | 6/1997 | deCler et al. | |
| D384,731 S | 10/1997 | Ramacier, Jr. et al. | |
| 5,692,935 A | 12/1997 | Smith | |
| 5,704,658 A | 1/1998 | Tozaki et al. | |
| 5,727,714 A | 3/1998 | Fawcett | |
| 5,811,359 A | 9/1998 | Romanowski | |
| 5,816,457 A * | 10/1998 | Croft | 224/148.2 |
| 5,845,943 A | 12/1998 | Ramacier, Jr. et al. | |
| 5,879,033 A | 3/1999 | Hänsel et al. | |
| 5,895,537 A * | 4/1999 | Campbell | 156/73.1 |
| 5,911,403 A | 6/1999 | deCler et al. | |
| 5,938,244 A | 8/1999 | Meyer | |
| 5,975,489 A | 11/1999 | deCler et al. | |
| 6,024,124 A | 2/2000 | Braun et al. | |
| 6,082,401 A | 7/2000 | Braun et al. | |
| 6,086,119 A | 7/2000 | Hänsel | |
| 6,089,616 A | 7/2000 | Trede et al. | |
| 6,161,578 A | 12/2000 | Braun et al. | |
| 6,231,089 B1 | 5/2001 | DeCler et al. | |
| 6,247,619 B1 | 6/2001 | Gill et al. | |
| 6,318,764 B1 | 11/2001 | Trede et al. | |
| 6,348,679 B1 | 2/2002 | Ryan et al. | |
| 6,382,593 B1 | 5/2002 | deCler et al. | |
| 6,428,055 B1 | 8/2002 | Moretti et al. | |
| 6,471,252 B1 | 10/2002 | Moretti et al. | |
| 6,497,348 B1 | 12/2002 | Forsman et al. | |
| 6,520,480 B1 | 2/2003 | Martin-Cocher et al. | |
| 6,557,899 B1 | 5/2003 | Martin-Cocher et al. | |
| 6,558,537 B1 | 5/2003 | Herrington et al. | |
| 6,607,179 B1 | 8/2003 | Moretti et al. | |
| 2002/0014498 A1 | 2/2002 | Forsman et al. | |
| 2002/0074533 A1 | 6/2002 | DeCler et al. | |
| 2002/0092879 A1 | 7/2002 | Chrisman et al. | |
| 2002/0119267 A1 | 8/2002 | Himmelmann et al. | |
| 2002/0125452 A1 | 9/2002 | Martin-Cocher et al. | |
| 2002/0129858 A1 | 9/2002 | Meyer et al. | |
| 2002/0170731 A1 | 11/2002 | Garber et al. | |
| 2002/0180210 A1 | 12/2002 | Martin-Cocher et al. | |
| 2002/0187289 A1 | 12/2002 | Chang et al. | |
| 2002/0190453 A1 | 12/2002 | Wilhelm et al. | |
| 2003/0015680 A1 | 1/2003 | Moretti et al. | |
| 2003/0021945 A1 | 1/2003 | Kelch | |
| 2003/0087015 A1 | 5/2003 | Wyslotsky et al. | |

OTHER PUBLICATIONS

Norbert Sparrow, "Rf Weldable Polyolefin Film Introduced," MPMN:Hotline, Apr. 2000.

CamelBak Protective Mask Adapter Kit, CamelBak Products, Inc., circa Jun. 2000.

NBC/CBR Reservoir and Gas Mask Adapter Kit, 2000 Maximum Gear Military & Law Enforcement Products Catalog, CamelBak Products, Inc., circa Jun. 2000.

"Chemical-Biological Warfare Safe Water Pouch," Texas Research Institute Austin, Inc., printed from www.tri-austin.com/pouch.php Web site in Sep. 2003.

* cited by examiner

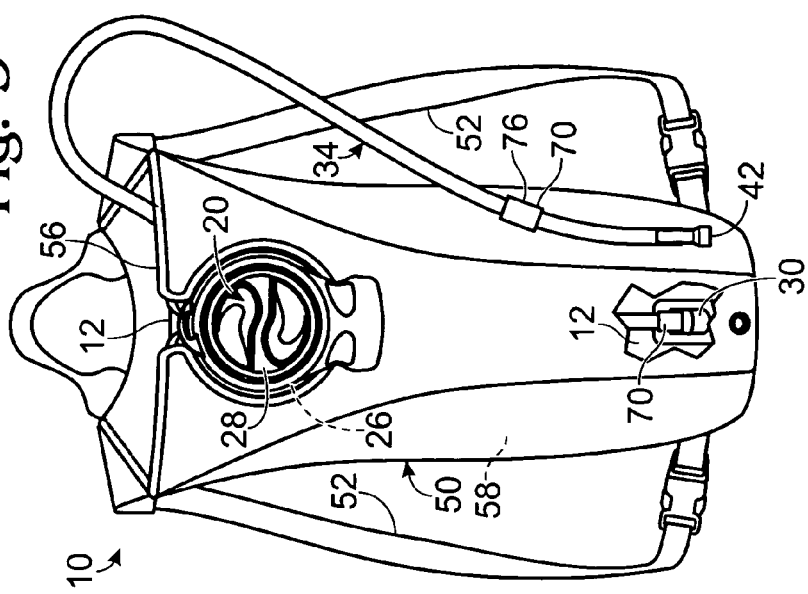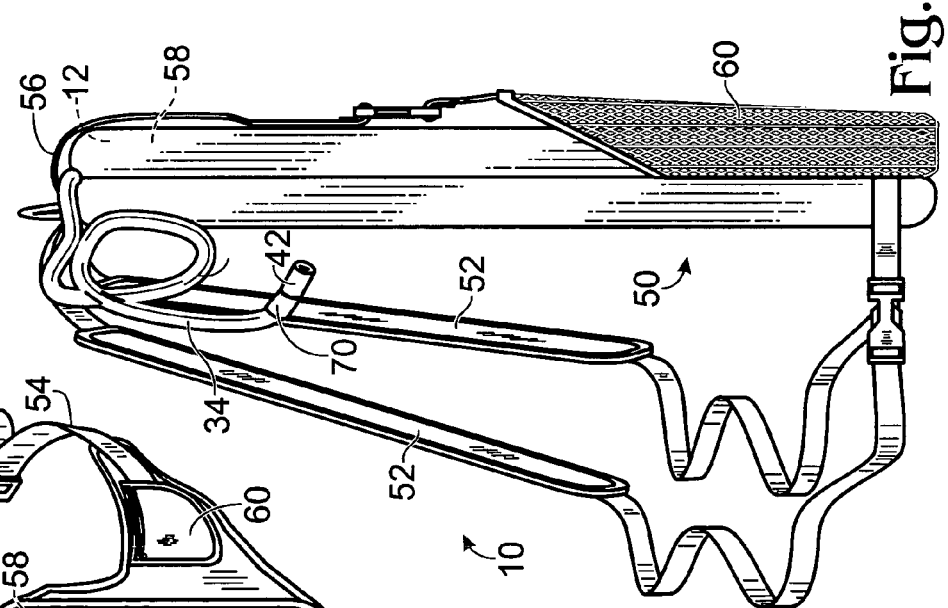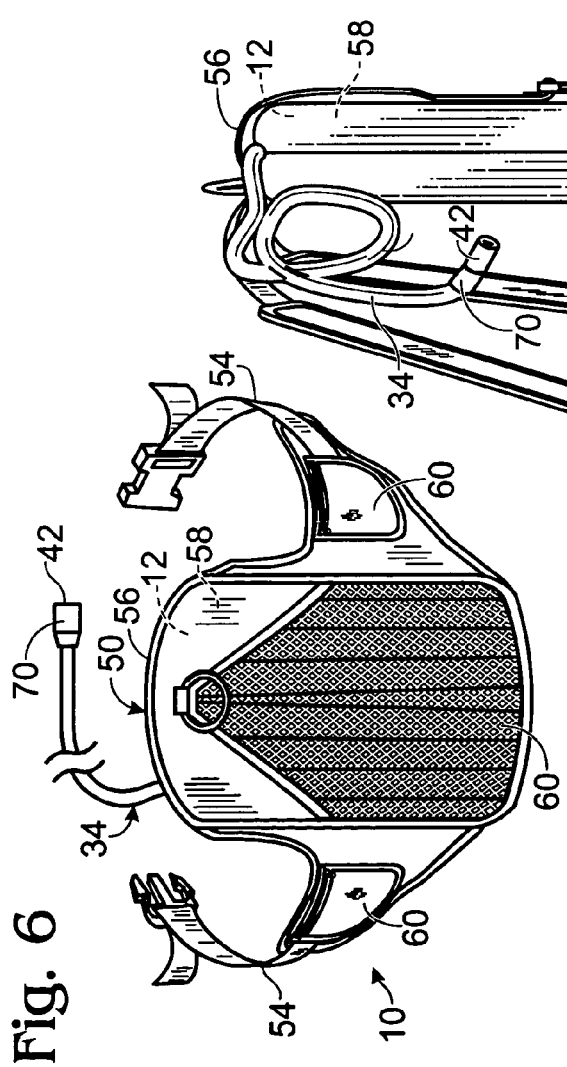

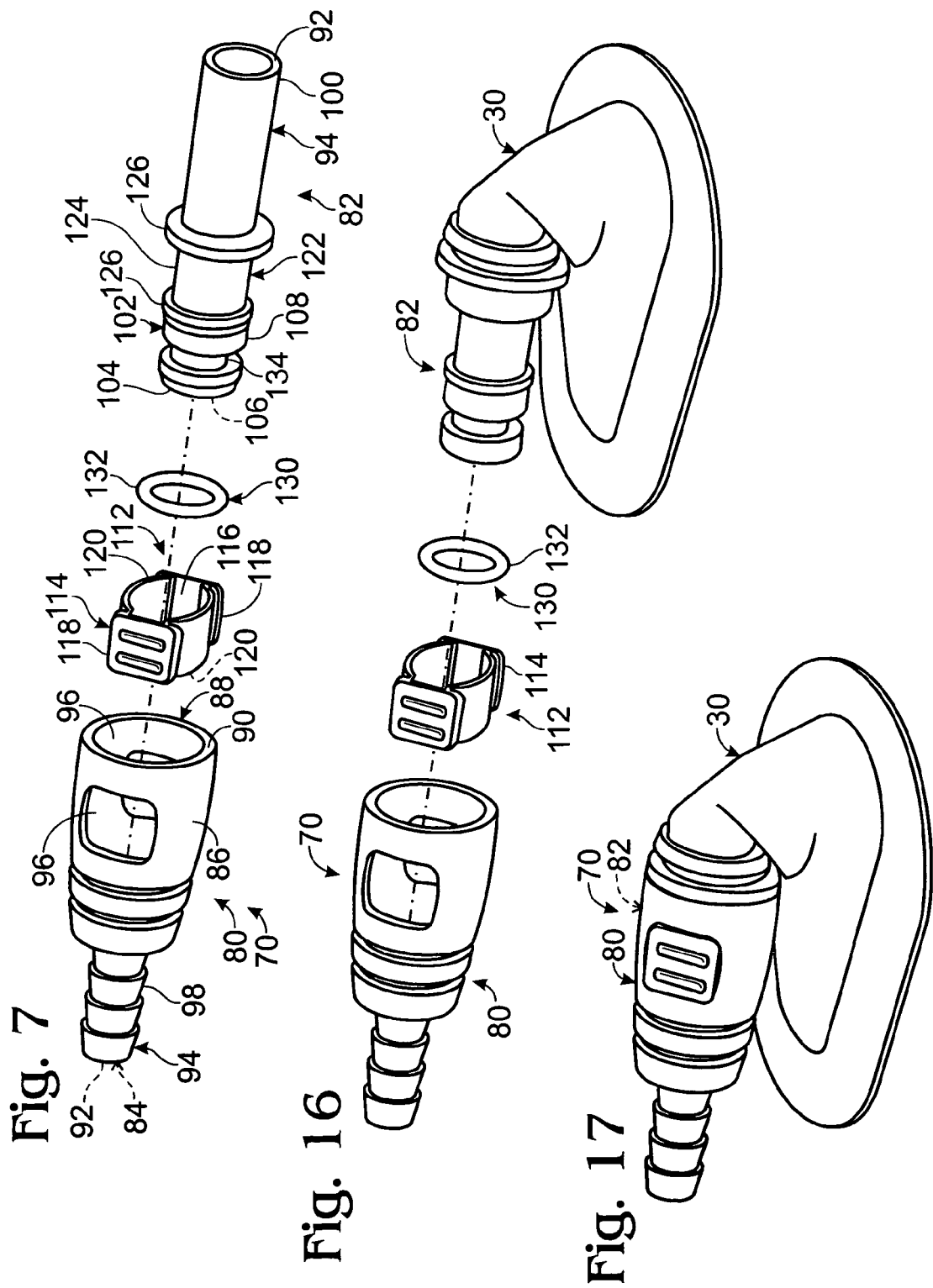

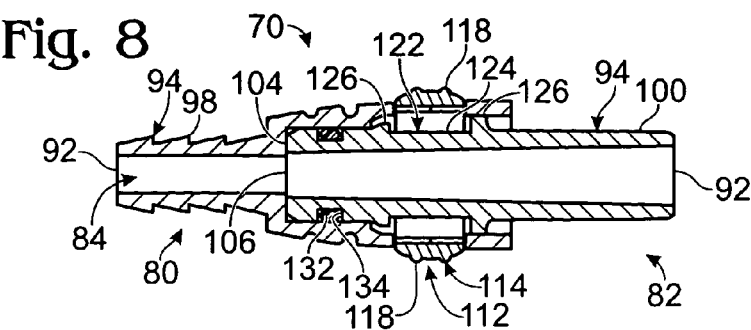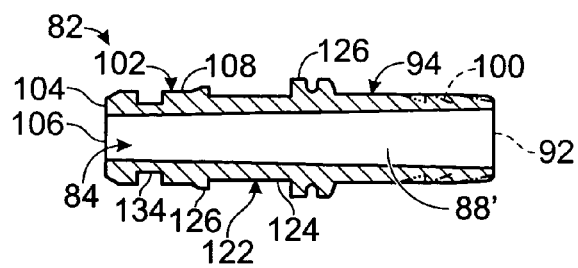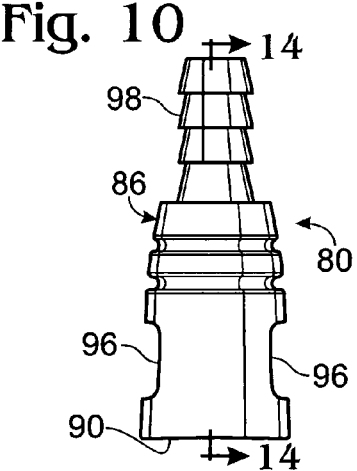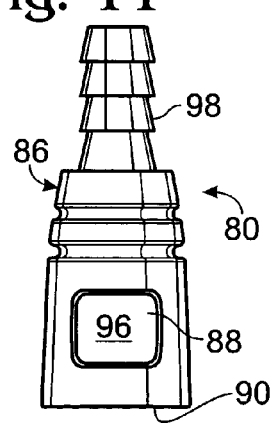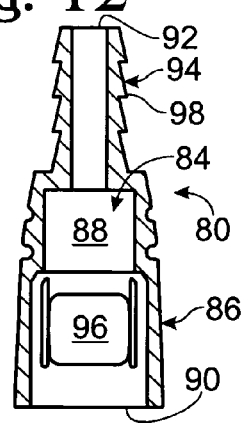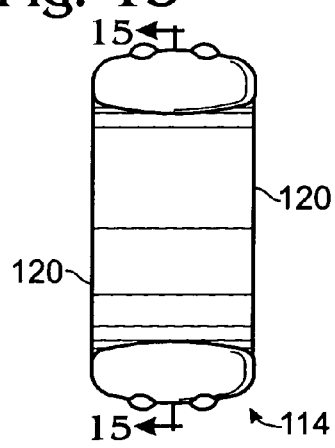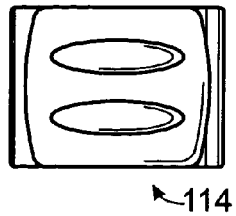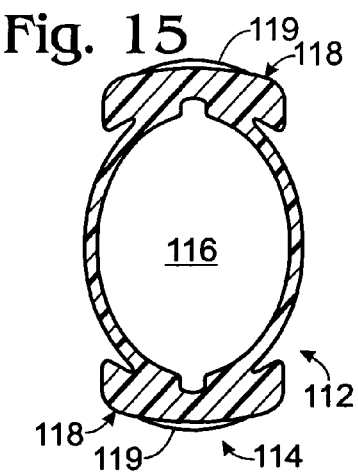

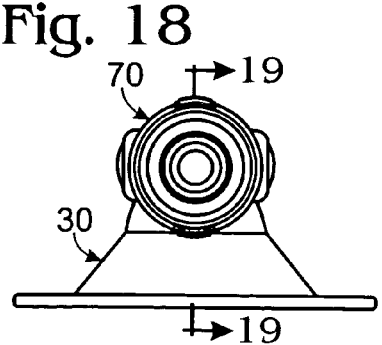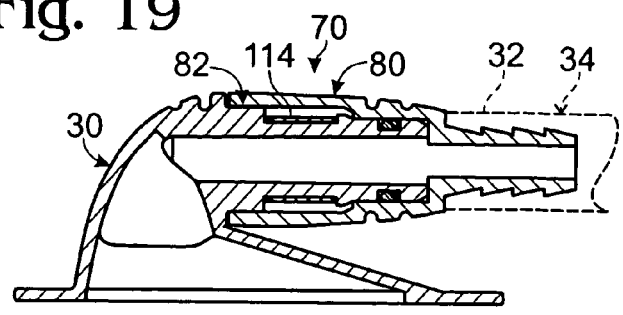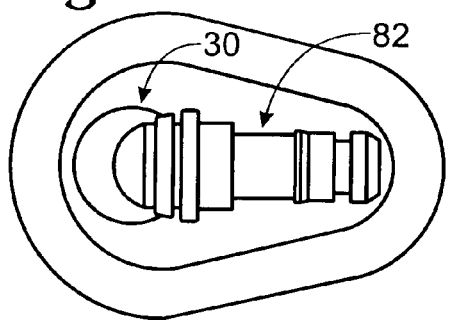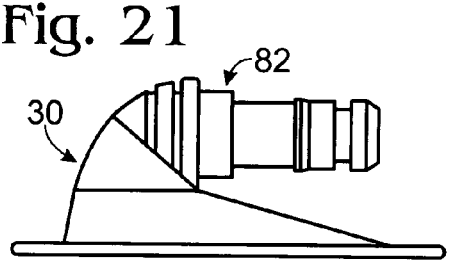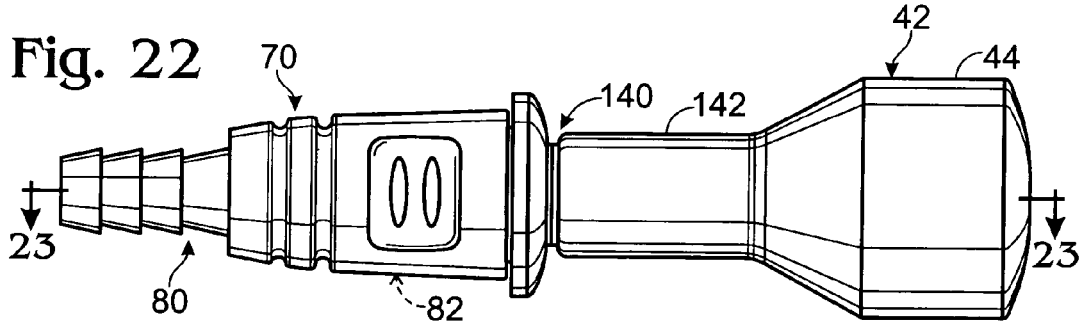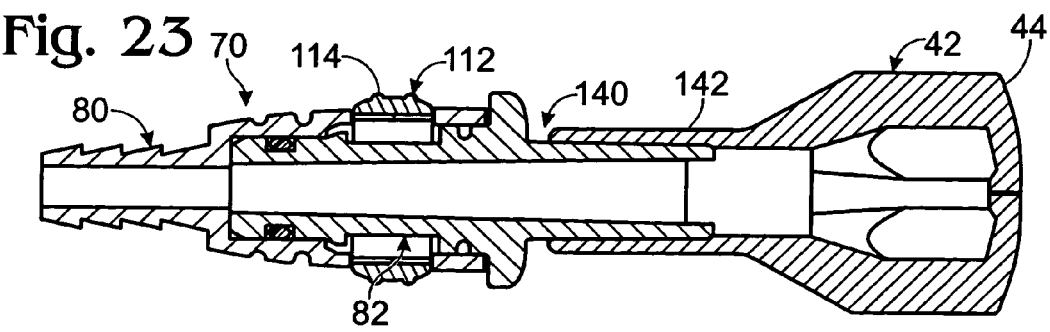

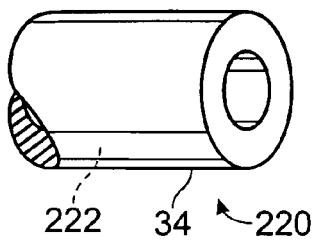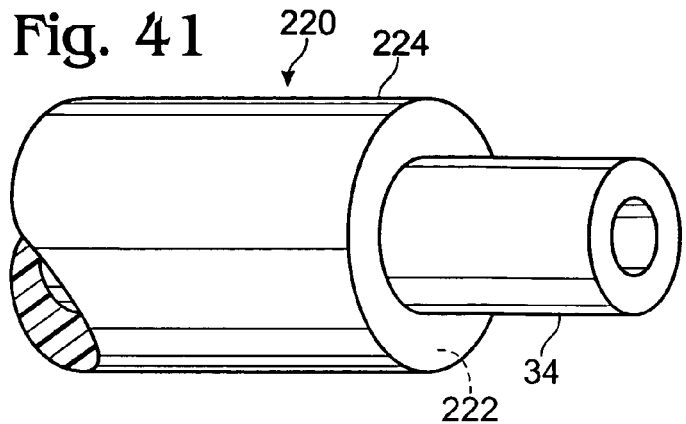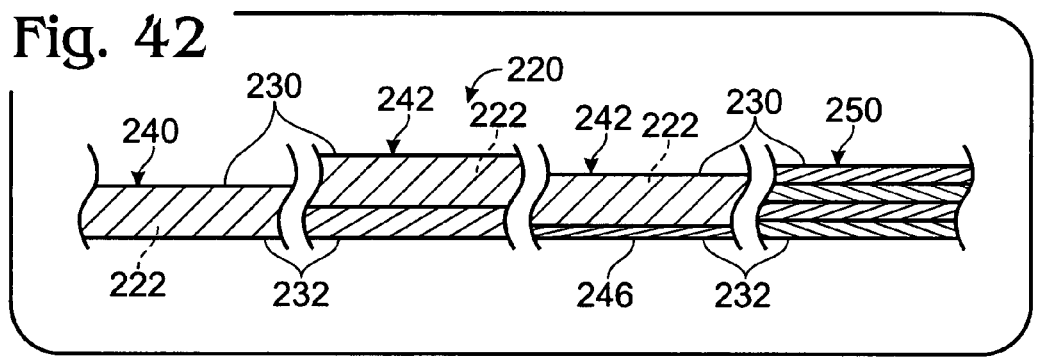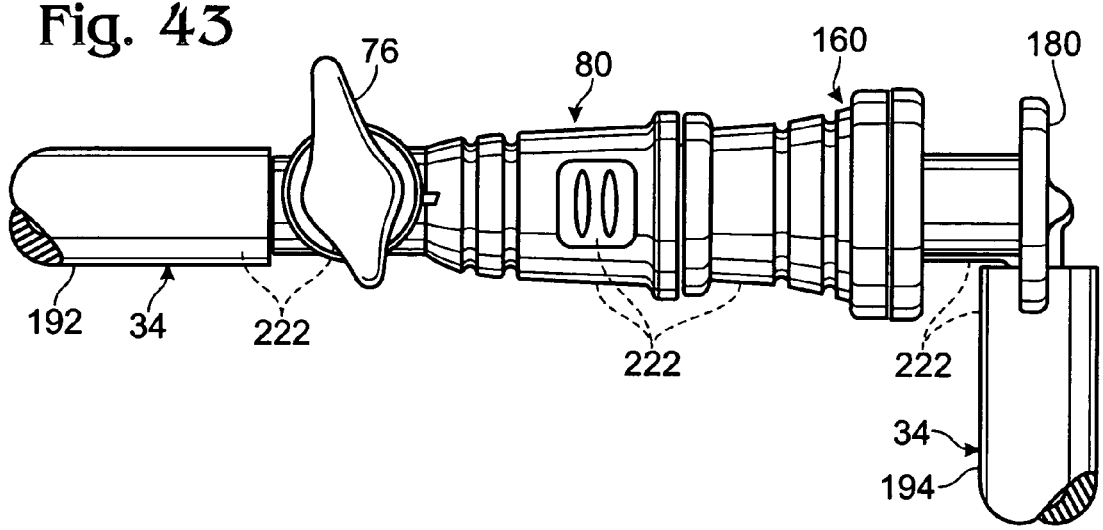

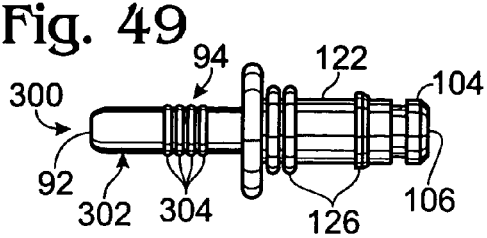
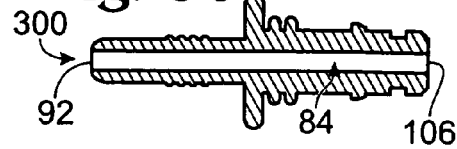
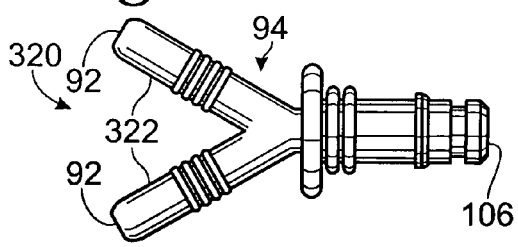
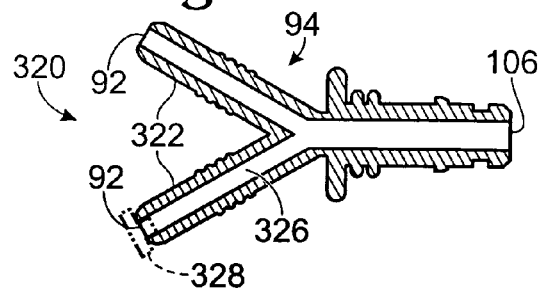
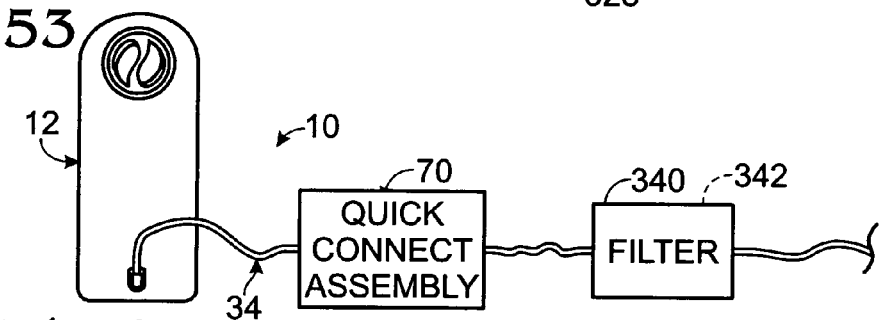
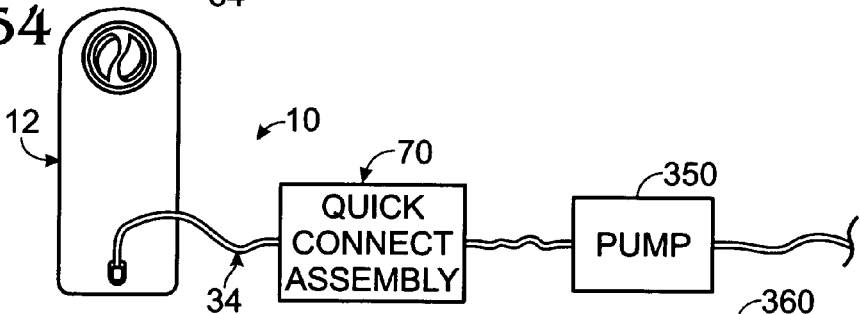
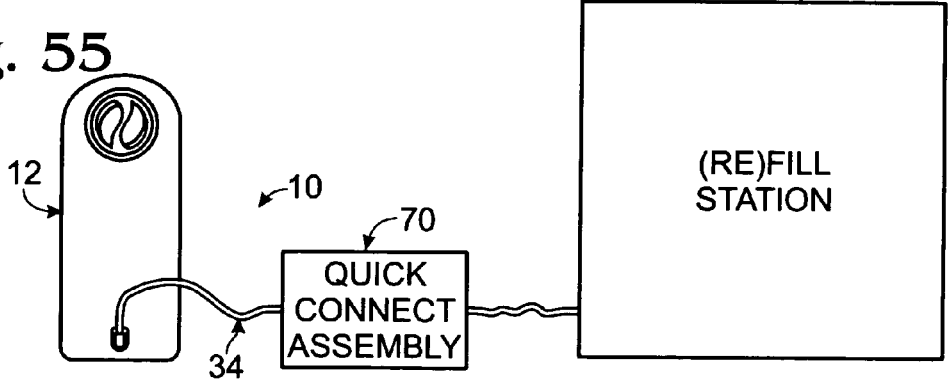

PERSONAL HYDRATION SYSTEM WITH COMPONENT CONNECTIVITY

RELATED APPLICATIONS

This application claims priority to and is a continuation-in-part of U.S. patent application Ser. No. 10/267,036, which was filed on Oct. 7, 2002 now U.S. Pat. No. 6,908,015, and which claims the benefit of U.S. Provisional Patent Application Ser. No. 60/328,260, which was filed on Oct. 9, 2001. The complete disclosures of the above-identified patent applications are hereby incorporated by reference for all purposes.

BACKGROUND

Medical research has demonstrated the importance of maintaining adequate hydration while engaging in strenuous physical activities, such as bicycling or mountain climbing. In the not too distant past, participants in such activities carried their water in bottles or canteens from which they drank periodically. More recently, personal hydration systems have been developed which allow users to drink more or less continuously while engaged in sporting or recreational activities. These personal hydration systems typically have a bag-like fluid reservoir that is carried in a back- or waist-mounted pack. A long flexible tube is connected to the reservoir through an exit port at one end and terminates in a mouthpiece at the other end. The tube is long enough to allow the mouthpiece to be carried in the user's mouth to enable the user to draw water from the reservoir at will. Examples of hydration systems and mouthpieces therefor are disclosed in U.S. Pat. Nos. 5,727,714, 5,060,833, 5,085,349, and 6,070,767, the disclosures of which are hereby incorporated by reference.

Although personal hydration systems have proven to be a great advance over traditional water bottles, they do suffer from some drawbacks. One drawback is that the components of the hydration system downstream from the fluid reservoir tend to be either permanently secured together, or else secured together via a tight friction fit that tends to be difficult to establish or release. Both of these structures provide effective fluid-tight seals. However, neither permits components to be quickly and repeatedly interchanged by a user.

SUMMARY OF THE DISCLOSURE

The present disclosure is directed to a personal hydration system with component connectivity. The hydration system includes a fluid reservoir that is adapted to receive and contain a volume of drink fluid. The reservoir may be housed within a pack. Drink fluid is drawn from the reservoir through a drink tube that is in fluid communication with the reservoir at one end and with a mouthpiece at the other end. In some embodiments, the drink tube is connected to the reservoir at an exit port. In some embodiments, the hydration system includes a manually actuated on/off valve downstream from the reservoir. In some embodiments, the hydration system includes a bite-actuated mouthpiece. In some embodiments, the drink tube includes more than one length of interconnected tubing. Hydration systems according to the present disclosure further include a quick-connect assembly that fluidly interconnects components of the hydration system and which is configured to quickly release, and permit reattachment of, the detached components or replacement components. In some embodiments, the replacement components enable different performance from the detached components. In some embodiments, the hydration system includes a quick-connect assembly that is adapted to selectively couple a bite-actuated mouthpiece and a gas mask adapter to the hydration system's drink tube. In some embodiments, at least a portion, if not the entire, hydration system is formed from a chemically resistant material.

Many other features of the present disclosure will become manifest to those versed in the art upon making reference to the detailed description which follows and the accompanying sheets of drawings in which preferred embodiments incorporating the principles of this disclosure are disclosed as illustrative examples only. Dimensions in the drawings are shown for purposes of illustration, but dimensions other than those shown may be used and are within the scope of the present disclosure.

BRIEF DESCRIPTION OF THE DRAWINGS

FIG. 4 is a side elevation view of a personal hydration system that includes a pack and illustrates schematically another quick-connect assembly according to the present disclosure.

FIG. 5 is a front elevation view of another personal hydration system that includes a back-mounted pack and schematically illustrates quick-connect assemblies according to the present disclosure.

FIG. 6 is a front elevation view of a personal hydration system that includes a waist-mounted pack and another schematic quick-connect assembly according to the present disclosure.

FIG. 7 is an exploded isometric view of a quick-connect assembly constructed according to the present disclosure.

FIG. 8 is a cross-sectional view showing another version of the assembly of FIG. 7 in its locked configuration.

FIG. 9 is a cross-sectional view of the male member of the assembly of FIG. 7.

FIG. 10 is a top plan view of the female member of FIG. 7.

FIG. 11 is a side elevation view of the female member of FIG. 7.

FIG. 12 is a cross-sectional view of the female member of FIG. 7 taken along the line 12—12 in FIG. 10.

FIG. 13 is a side elevation view of the lock ring of FIG. 7.

FIG. 14 is a top plan view of the lock ring of FIG. 13.

FIG. 15 is a cross-sectional view of the lock ring of FIG. 13 taken along the line 15—15 in FIG. 13.

FIG. 16 is an exploded isometric view of a quick-connect assembly integrated with an exit port.

FIG. 17 is an assembled isometric view of the assembly and the exit port of FIG. 16.

FIG. 18 is an end elevation view of the assembly and the exit port of FIG. 16.

FIG. 19 is a cross-sectional view of the assembly and the exit port of FIG. 18 taken along line 19—19 in FIG. 18 and showing a fragmentary end of an attached drink tube in dashed lines.

FIG. 20 is a top plan view of the exit port and the male member of the quick-connect assembly of FIG. 16.

FIG. 21 is a side elevation view of the exit port and the male member of the quick-connect assembly of FIG. 16.

FIG. 22 is a side elevation view of the assembly of FIG. 7 with a bite-actuated mouthpiece mounted thereupon.

FIG. 23 is cross-sectional view of the assembly and the mouthpiece of FIG. 22 taken along the line 23—23 in FIG. 22.

FIG. 40 is a fragmentary isometric view showing a chemically resistant component that may be used with quick-connect assemblies according to the present disclosure.

FIG. 41 is a fragmentary isometric view showing another chemically resistant component that may be used with quick-connect assemblies according to the present disclosure.

FIG. 42 is a fragmentary, schematic view of illustrative chemically resistant components that may be used with quick-connect assemblies according to the present disclosure.

FIG. 43 is a fragmentary side elevation view of a chemically resistant quick-connect assembly and drink tube according to the present disclosure.

FIG. 49 is a top plan view of another male member that may be used with quick-connect assemblies according to the present disclosure.

FIG. 50 is a cross-sectional view of the male member of FIG. 49.

FIG. 51 is a top plan view of another male member that may be used with quick-connect assemblies according to the present disclosure.

FIG. 52 is a cross-sectional view of the male member of FIG. 51.

FIG. 53 schematically shows a quick connect assembly establishing fluid communication between a fluid reservoir and a filter.

FIG. 54 schematically shows a quick connect assembly establishing fluid communication between a fluid reservoir and a pump.

FIG. 55 schematically shows a quick connect assembly establishing fluid communication between a fluid reservoir and a refill station.

DETAILED DESCRIPTION AND BEST MODE

Figure 1:
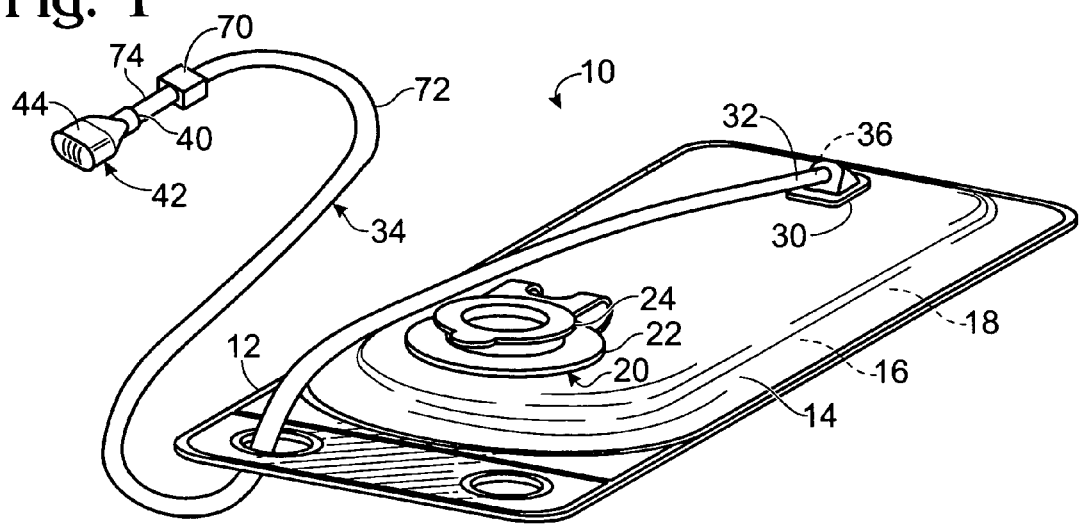
FIG. 1 is an isometric view of a personal hydration system that includes a schematic representation of a quick-connect assembly according to the present disclosure.
Figure 2:
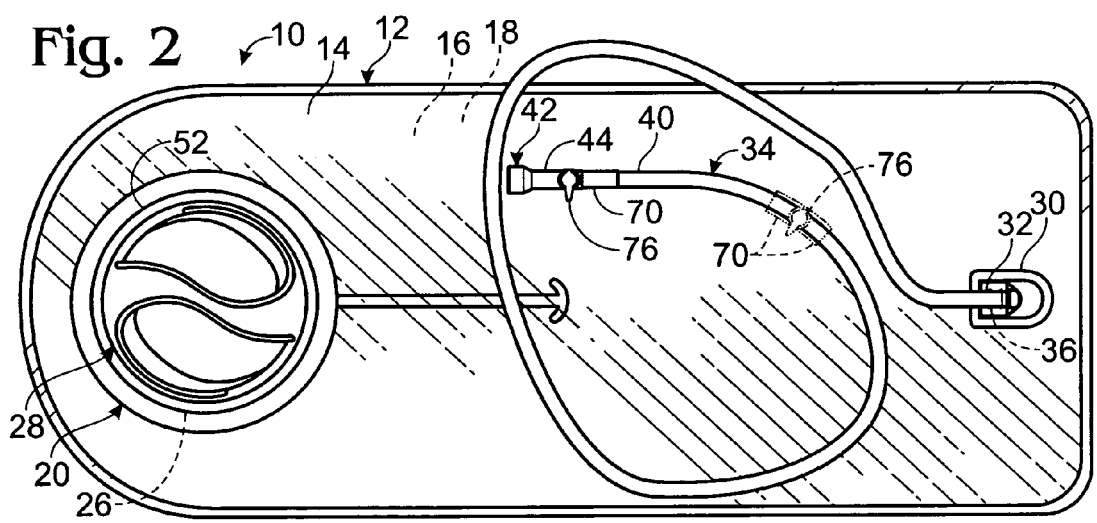
FIG. 2 is a top plan view of a personal hydration system with schematic representations of several different quick-connect assemblies according to the present disclosure.
Figure 3:
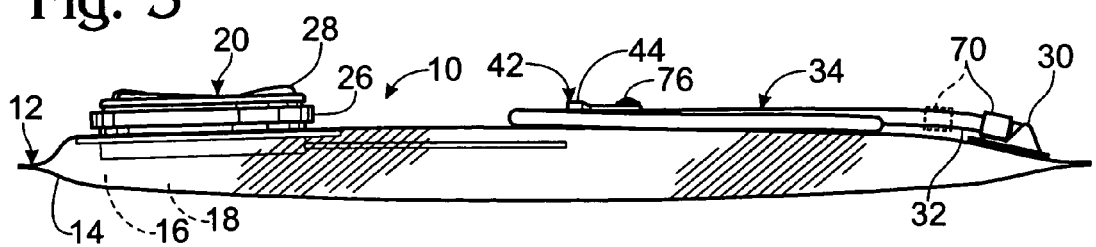
FIG. 3 is a side elevation view of the personal hydration system of FIG. 2 showing additional schematic representations of quick-connect assemblies according to the present disclosure.

Illustrative examples of personal hydration systems are shown in FIGS. 1–3 and generally indicated at 10. System 10 includes a fluid reservoir, or bladder, 12 for storing potable drink fluid, such as water, sports drinks, juice, etc. Reservoir 12 includes a body portion 14 with an internal compartment 16, which is adapted to store a volume of drink fluid 18. Typically, compartment 16 will hold at least 24 ounces, and it may hold as much as 32 ounces, 50 ounces, 70 ounces, 100 ounces, 200 ounces or more of drink fluid 18. Reservoir 12 is preferably flexible, with at least a region, if not the entirety, of body portion 14 and/or reservoir 12, being formed from a flexible, waterproof material. An example of a suitable material is polyurethane, although others may be used.

Reservoir 12 may vary in shape and size within the scope of this disclosure, such as depending on the volume of fluid to be carried by the user and the intended use of the hydration system. For example, and as discussed in more detail below, hydration systems according to the present disclosure may (but are not required to) include a pack into which the reservoir is permanently or removably housed. In such an embodiment, the reservoir will be sized to fit within the pack, and the pack will typically include one or more straps that are configured and sized to extend around a portion of a user's body, such as the user's shoulder(s) or waist. Some hydration systems are adapted to be received or otherwise carried within a user's clothing or on a device, such as a bicycle, that is proximate a user while the user is engaged in a particular activity. In such an embodiment, the clothing or device will typically include a sleeve or other mount sized to receive the hydration system and/or the hydration system will typically include one or more suitable mounts for securing the reservoir to the device or within a user's clothing.

Reservoir 12 includes an input port 20 through which the reservoir is charged with a volume of potable drink fluid.

Illustrative examples of suitable input ports 20 are shown in FIGS. 1–3. For example, in FIG. 1 port 20 takes the form of a sealable filler spout 22 with a cap 24 that is selectively secured to the spout through a friction fit. In this configuration, the cap is pressed directly onto the spout to establish a frictional seal therebetween. In FIGS. 2 and 3, port 20 takes the form of a threaded neck 26 upon which a threaded cap 28 is threadingly engaged to seal the opening in the neck. Other examples include a reservoir that is sealed by folding or otherwise interlocking or compressing opposed surfaces of the reservoir together to close an opening formed in the reservoir.

Reservoir 12 also includes an exit port, or output port, 30 through which drink fluid is drawn from compartment 16 for delivery to a user. As shown in FIGS. 1–3, an end 32 of an elongate, flexible drink tube, or tube assembly, 34 is mounted or otherwise fluidly connected to port 30. As used herein, the term "tube assembly" may refer to a single length of tubing that defines a fluid conduit for drink fluid drawn from reservoir 12, as well as to a plurality of interconnected lengths of tubing. Tube assembly 34 is of sufficient length to extend from reservoir 12 to the user's mouth when the system is worn by the user, such as on the user's back or waist. End 32 may be removably attached to port 30, or may be integrally formed or permanently mounted thereupon. For example, as shown in FIGS. 1 and 2, exit port 30 is mounted on body 14 and includes a fitting, or mount, 36 to which end 32 is secured. It is within the scope of this disclosure that exit port 30 may have a variety of configurations, including an embodiment in which exit port 30 includes an aperture in body 14 through which end 32 is inserted. An illustrative example of a suitable exit port is disclosed in U.S. Pat. No. 5,727,714, the complete disclosure of which is hereby incorporated by reference for all purposes, but any suitable structure that enables the drink tube to be fluidly coupled to the compartment of reservoir 12 may be used.

The other end 40 of tube assembly 34 is adapted to provide fluid 18 that is drawn from compartment 16 through exit port 30 and tube assembly 34 to a user's mouth. A mouthpiece 42 is typically coupled with end 40 of tube assembly 34, such that tube assembly 34 is in fluid communication with mouthpiece 42. Mouthpiece 42 may be removable from tube assembly 34 or alternatively may be integrated with tube assembly 34. For example, mouthpiece 42 may simply be the end 40 of tube assembly 34 distal output port 30, the output of the subsequently described quick-connect assembly, an output from a mouthpiece or other structure mounted on the subsequently described quick-connect assembly, or structure that is removably or permanently attached to end 40. As used herein, components of the hydration system that extend from the reservoir and through which drink fluid drawn from the reservoir through exit port 30 flows may be referred to as being downstream from the reservoir. Accordingly, the exit port and other elements of the hydration system downstream from the reservoir may be referred to as the downstream assembly of the hydration system. However, as disclosed subsequently herein, in some modes of operation drink fluid may flow in the other direction, namely, through exit port 30 and into the reservoir. For example, filtered or unfiltered drink fluid may be pumped into the reservoir, or the reservoir may be refilled in another manner. For the purpose of simplicity, the use of "upstream" and "downstream" refers to when the reservoir is an output mode of operation in which fluid is being drawn from the reservoir through exit port 30.

An example of a mouthpiece 42 is a bite-actuated, or mouth-actuated, mouthpiece 44 that it is selectively deformed from a sealed (or closed) position, in which fluid is prevented from being dispensed from the mouthpiece, to a dispensing (or open) position, in which the user may draw fluid from the reservoir through the tube and mouthpiece when the user compresses the mouthpiece with the user's teeth or lips. Bite-actuated mouthpieces are often biased or otherwise configured to automatically return to the closed position when a user is not exerting force upon the mouthpiece to configure the mouthpiece to its closed position. Examples of suitable bite-actuated mouthpieces are disclosed in U.S. Pat. Nos. 6,070,767, 5,727,714, 5,085,349 and 5,060,833, the complete disclosures of which are hereby incorporated by reference.

As shown in FIGS. 4–6, system 10 may include a pack 50 within which reservoir 12 is permanently or removably housed. Pack 50 typically is adapted to be worn on a user's body. For example, the pack shown in FIGS. 4 and 5 includes a pair of shoulder straps 52 for mounting the pack on a user's back or chest. Although a pair of straps 52 is shown in FIGS. 4 and 5, it is within the scope of this disclosure that only a single strap may be used, such as to extend diagonally across a user's torso or over a selected one of the user's shoulders. As a further example, pack 50 is shown in FIG. 6 including waist straps 54 that are adapted to secure the pack around a user's waist. Straps 52 and 54 may be formed from one or more segments that are adapted to define (alone or with the pack) a closed perimeter, such as to encircle a portion of a user's body. It is further within the scope of this disclosure that pack 50 may include one or more waist straps and one or more shoulder straps, or as discussed herein, no straps at all.

In FIGS. 4–6, it can be seen that pack 50 includes an opening 56 through which reservoir 12 may be selectively inserted and removed from a storage compartment 58 within the pack. It should be understood that packs into which reservoirs are permanently mounted may be formed without such an opening. Pack 50 may be adapted to hold items in addition to reservoir 12. For example, in FIGS. 4 and 6, pack 50 is shown including one or more pockets 60. Similarly, compartment 58 may be sized so that it is sufficiently larger than reservoir 12 that other items may be stored within the compartment. Additionally or alternatively, pack 50 may include one or more internal compartments that are adapted to hold items other than reservoir 12.

Examples of hydration systems and mouthpieces therefor are disclosed in the above-identified and incorporated U.S. patents, as well as in pending U.S. patent application Ser. No. 09/902,935 and U.S. Pat. No. 6,497,348, the disclosures of which are also hereby incorporated by reference for all purposes. It is within the scope of this disclosure that hydration system 10 may be formed without a pack. For example, hydration systems that are designed to be received within a user's clothing may be formed without a pack. Similarly, a hydration system may be added as an accessory to a pack, such as a backpack, knapsack or fanny pack, that is not specifically configured to receive that hydration system.

Personal hydration systems according to the present disclosure further include at least one quick-connect assembly 70. Assembly 70 is adapted to fluidly and mechanically interconnect portions of the hydration system downstream (toward mouthpiece 42) from reservoir 12. Assembly 70 enables the interconnected components to be quickly and repeatedly coupled together and released from engagement without requiring the time or effort required with conventional hydration system components. As such, the quick-connect assembly may also be described as a quick connect/disconnect assembly, or quick coupling assembly. As described in more detail herein, the quick-connect assembly includes at least a pair of members that are configured to be fluidly connected with adjacent components of a hydration system. The members are further adapted to selectively and releasably interconnect with each other, such as by being releasably secured together by a lock member of the assembly.

In FIGS. 1–6, various illustrative placements for assembly 70 are schematically illustrated. For example, in FIG. 1, assembly 70 is shown interconnecting adjacent lengths 72 and 74 of tubing forming tube assembly 34. In FIG. 2, assembly 70 is shown interconnecting end 40 of tube assembly 34 with a manually operated on/off valve 76. In FIG. 2, valve 76 and assembly 70 are shown in solid lines proximate mouthpiece 42, in what may be referred to as an end-of-line configuration. However, it is within the scope of this disclosure that an in-line configuration may be used as well, as illustrated in dashed lines in FIG. 2. Similarly, a pair of assemblies 70 is shown in dashed lines in FIG. 2 to schematically represent that the assembly may be located on either, or both, sides of valve 76. In FIG. 3, assembly 70 is shown in solid lines interconnecting end 32 of tube assembly 34 with exit port 30, and in dashed lines in another in-line configuration. In FIG. 4, assembly 70 is shown interconnecting end 40 and mouthpiece 42.

Assembly 70 includes at least one mount to which a component of hydration system 10 is fluidly interconnected so that drink fluid drawn from reservoir 12 may flow through a fluid conduit defined at least partially by the assembly. When assembly 70 is configured for in-line operation, it will typically include a pair of generally opposed mounts, one for establishing a fluid interconnection with a portion of the hydration system downstream from the reservoir and upstream from the quick-connect assembly, and another for establishing a fluid interconnection with a portion of the hydration system downstream from the quick-connect assembly. As used herein, the term "fluid communication" refers to elements between which drink fluid may flow, and the terms "fluidly connected," "fluidly interconnected," and the like are used to refer to components that are coupled together and between which drink fluid may flow. Illustrative examples of components that may be connected upstream relative to the quick-connect assembly include exit port 30, a length of tube assembly 34, and an on/off valve. Illustrative examples of components that may be connected downstream relative to the quick-connect assembly include an on/off valve, length of tube assembly 34, a mouthpiece 42, a pump, a filter, and/or a refill reservoir.

It is also within the scope of this disclosure that assembly 70 may include at least one component integrated therewith. By this it is meant that the component may be at least partially integrally formed with a portion of assembly 70, such as by sharing a common housing, and/or that the component is permanently mounted or otherwise secured to the assembly such that the component is not designed or configured to be repeatedly removed from and reattached to the assembly. Illustrative and non-exclusive examples of components that may be integrated with the assembly include mouthpiece 42, exit port 30 and on/off valve 76. This integration of components with assembly 70 is schematically illustrated in FIGS. 5 and 6, with assemblies 70 respectively including exit port 30 and on/off valve 76 in FIG. 5, and mouthpiece 42 in FIG. 6. As a further variation, assembly 70 may be integrated with a fitting that is configured to interchangeably receive a component of the hydration system or a device to which the hydration system will be coupled.

An example of a quick-connect assembly 70 that is constructed according to the present disclosure is shown in FIGS. 7 and 8. As shown, assembly 70 includes female and male members 80 and 82 that are configured to releasably engage each other to establish a mechanical interconnection therebetween. Members 80 and 82 also define a fluid conduit 84 that extends through the members to enable drink fluid that is drawn from reservoir 12 to be drawn through the members, either for dispensing directly to a user or to components of the hydration system that are attached to assembly 70 and extend downstream therefrom. Members 80 and 82 are configured to be quickly and repeatedly released from engagement with each other, such as when a user depresses a release member, which is discussed in more detail subsequently. Members 80 and 82 may also be described as female coupling members and male coupling members, respectively.

Female member 80 includes a body 86 that defines a central cavity 88. As perhaps best seen in FIG. 12, cavity 88 forms part of a fluid conduit 84, which extends through female member 80 from an opening 90 to a corresponding opening 92 in a distal region 94. Opening 90 is sized to receive at least the tip of the subsequently described male member. In the illustrated embodiment, region 94 is generally opposed to opening 90 and is in fluid communication therewith such that drink fluid that enters cavity 88 through a first one of openings 90 or 92 may flow through the cavity and exit the cavity through the other one of the openings. Body 86 also includes at least one lateral aperture 96. As shown in FIGS. 7–8 and 10–12, a pair of apertures 96 is shown, but it is within the scope of this disclosure that more or less apertures may be used, such as a single aperture or multiple apertures.

Region 94 includes either a mount or a component of the hydration system. In FIG. 7, female member 80 is shown with a region 94 in the form of a barbed mount 98 for tube assembly 34. It is within the scope of this disclosure that region 94 and/or mount 98 may have other configurations. For example, when region 94 takes the form of a mount 98 for a length of tubing forming a part of tube assembly 34, the mount should be configured so that the tubing may be coupled thereto to form a fluid-tight seal, and preferably retained upon the mount with sufficient force so that the tubing is not inadvertently removed from the mount. In the illustrated embodiment shown in FIGS. 7–8 and 10–12, the tubing is stretched over mount 98, but it is also within the scope of this disclosure that the tubing may be inserted into a bore in the mount and/or that the mount extends both internal and external the tubing. As a further example, and as discussed in more detail herein, region 94 may also include a mount for exit port 30, mouthpiece 42, on/off valve 76, or other components of the hydration system, and/or may include any of these components integrated therewith.

As shown in FIGS. 7–9, male member 82 also includes a region 94 that may have any of the configurations, elements and variations as the corresponding region 94 described with respect to the female member. For the purposes of illustrating additional suitable configurations, region 94 is illustrated as a mount 100 that does not include barbs. Mount 100 may receive mouthpiece 42 or a length of tubing, similar to mount 98. In dashed lines in FIG. 9, mount 100 is shown with a barbed fitting to provide a graphical illustration of this version of male member 82. With reference to FIG. 9, it can be seen that male member 82 further includes a shaft 102 with a tip 104 that is adapted to be inserted through the opening in a corresponding female member. In the illustrated embodiment, tip 104 is externally tapered, or beveled, but this configuration is not required. Male member 82 also includes a cavity 88' that defines a portion of fluid conduit 84, and which extends from an opening 92 in region 94 and at least partially through shaft 102 to another opening 106. In the illustrated embodiment, opening 106 is formed in tip 104, but it is within the scope of this disclosure that shaft 102 may additionally or alternatively include one or more openings that extend through the sidewalls 108 of shaft 102. As perhaps best seen in FIGS. 7 and 8, drink fluid that flows through the quick-connect assembly enters and exits the assembly through openings 92. Accordingly, the openings may also be referred to as ports. It should be understood that the respective ports may form entry ports or exit ports depending upon the fluid flow orientation of the male and female members relative to the reservoir (i.e. which member is upstream or downstream from the other relative to the reservoir) and/or the direction of fluid flow (i.e. into the reservoir or out of the reservoir).

In FIGS. 7 and 8, regions 94 are depicted defining a linear fluid conduit 84 extending therebetween. It is within the scope of this disclosure that the regions may define a non-linear fluid conduit that extends therebetween, or a fluid conduit that includes both linear and non-linear portions. For example, regions 94 may extend at angles of less than 180° relative to the long axes of the portions of the fluid conduit defined thereby. For example, the regions may extend at angles in the range of 15–165°, 30–150°, 45–135°, 90°, etc. Because the male and female members are configured to be coupled together in an at least partially overlapping (or nested) configuration, the portion of the male member 82 that is inserted into opening 90 of female member 80 will typically be complimentarily configured with the corresponding portion of female member 80 to establish a fluid-tight connection therebetween.

In FIG. 7, assembly 70 further includes a lock member 112, which is adapted to mechanically and releasably secure the male and female members together. In the illustrated embodiment, lock member 112 takes the form of a lock ring 114, which includes a central passage 116 and at least one ear, or projecting member, 118 extending generally away from the passage. Passage 116 is sized so that tip 104 and at least a portion of shaft 102 of male member 82 may be inserted therethrough. In FIG. 7, a pair of projecting members 118 is shown, with each of the projecting members being sized to extend into a corresponding one of the apertures 96 in female member 80. Typically, the number of projecting members 118 will be at least as great as the number of apertures 96. Additional views of lock ring 114 are shown in FIGS. 13–15.

In the illustrated embodiment, the lock ring includes a pair of projecting members 118 that are each adapted to extend into and at least partially through a corresponding pair of apertures 96 in the female member within which the lock ring is housed. In such a configuration, the projecting members may be described as being buttons, or external actuators, in that the projecting members are configured to be depressed or otherwise urged generally toward each other by the application of user-applied forces from external the quick-connect assembly. As indicated in FIG. 15, the projecting members may be described as including engagement surfaces 119 that are sized and positioned to be depressed by a user's fingers to actuate the lock ring. As discussed, however, this illustrative configuration is not required, and lock rings or other lock members according to the present disclosure may have different configurations and/or operative functionality.

Figure 44:
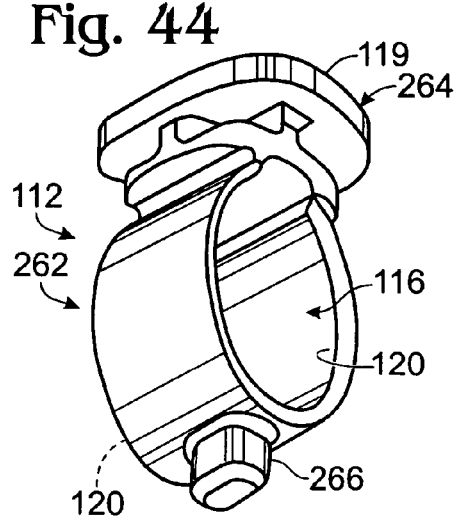
FIG. 44 is an isometric view of another lock ring according to the present disclosure.
Figure 45:
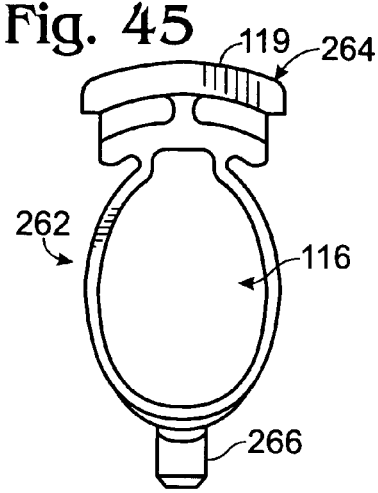
FIG. 45 is a front elevation view of the lock ring of FIG. 44.

Another illustrative example of another suitable configuration for a lock member 112 in the form of a lock ring is shown in FIGS. 44 and 45 and generally indicated at 262. Similar to the previously discussed lock ring 114, lock ring 262 includes a central passage 116 that is bounded by a pair of openings 120 through which at least the tip and typically also a portion of the shaft of a corresponding male member is inserted and selectively retained. In further similarity, lock ring 262 also includes a pair of projecting members 118. However, unlike the previously illustrated lock ring 114, lock ring 262 includes a first projecting member 264 with an engagement surface 119 that is adapted to extend into and at least partially through an aperture 96 in a female member, and a second projecting member 266 that is adapted to be received into or otherwise engaged by a mount in the female member and which does not include an engagement surface. As such, lock ring 262 may be described as demonstrating a "one button" configuration, in that it is configured to receive user-applied external forces to only a single projecting member to urge the lock ring toward its open, or unlocked, configuration, in which a retained male member is released and thereby able to be removed from the lock ring and corresponding female member.

Figure 46:
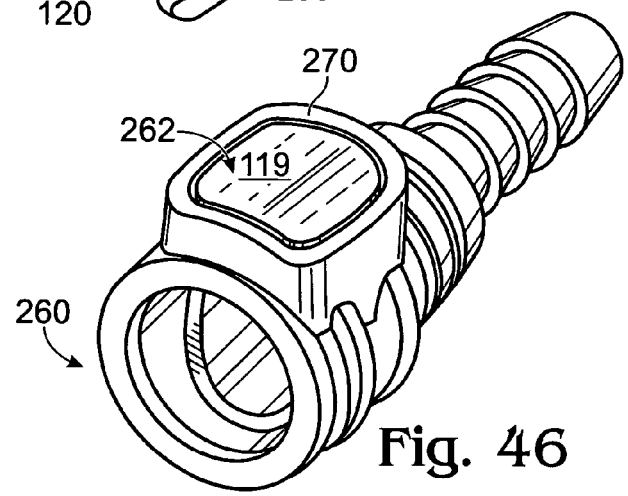
FIG. 46 is an isometric view showing the lock ring of FIGS. 44 and 45 housed within a corresponding female member.
Figure 47:
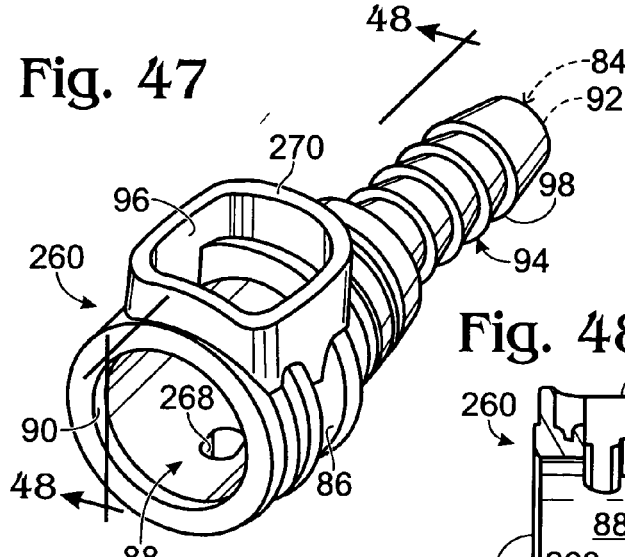
FIG. 47 is an isometric view of a female member of FIG. 46.
Figure 48:
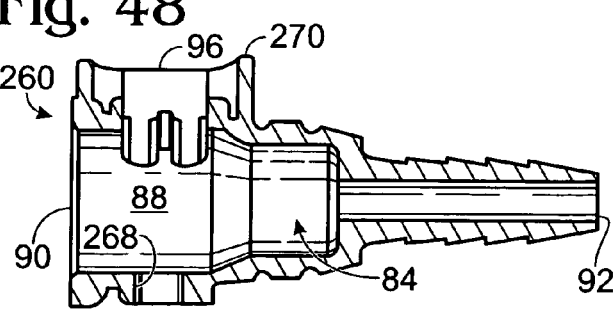
FIG. 48 is a cross-sectional view of the female member of FIGS. 46 and 47.

In FIG. 46, lock ring 262 is shown housed within a female member 260, with FIGS. 47 and 48 providing additional views of the female member. Similar to the previously illustrated female members, member 260 defines a portion of fluid conduit 84 between openings 90 and 92 and through which drink fluid may flow. Opening 90 is sized to receive at least a portion of the shaft of a corresponding male member therethrough, and opening 92 is associated with the distal region 94 of the female member. As shown, region 94 includes a mount 98, such as for a length of flexible tubing; however, and as discussed herein, distal region may include a variety of configurations and componentry without departing from the scope of the present disclosure. As perhaps best seen in FIGS. 47 and 48, female member 260 includes a mount 268 that is adapted to receive projecting member 266 of lock ring 262. In the illustrated embodiment, mount 268 includes a recess that extends at least partially, or even completely, through the body 86 of the female member and into which projecting member 266 is inserted. It is within the scope of the present disclosure that lock rings and/or female members may include any suitable structure for positioning and supporting the lock ring within the female member in an operative configuration for selectively retaining and releasing a corresponding male member of a quick-connect assembly. For example, mount 268 does not need to define a recess or aperture in the body of the female member and instead may project into the central cavity 88 of the female member to engage and support the lock ring. As another example, the mount may be sized and configured to engage a region of the lock ring that is distal surface 119 but which does not include a projecting member.

Member 260 also illustrates a projecting guard, or flange, 270 that may be used with any of the female members according to the present disclosure. Guard 270 is adapted to border, or extend at least partially around, surface 119 of the projecting member to reduce the likelihood of unintentional depression of the lock ring to its unlocked configuration. Preferably, guard 270 is sized and/or positioned so that a planar member that is larger than surface 119 cannot urge the lock ring to its unlocked configuration, in which the male member may be selectively removed from the lock ring.

Instead, guard 270 preferably requires a user's finger tip or other actuator to be inserted at least partially within a perimeter region defined by the guard. It is within the scope of the disclosure that guard 270 may not extend completely around the perimeter of surface 119 and/or that the guard may be comprised of two or more discontinuous portions. For example, the guard may include a plurality of projections, or ribs, that projecting in spaced-apart intervals around the perimeter of surface 119. As another example, the guard may be configured to protect opposing sides of a four sided projecting member while leaving the other two sides at least partially open.

In operation, lock rings 114 and 262 are respectively positioned within a cavity 88 of female members 80 and 260, with a projecting member 118 extending into and optionally at least partially through each of the apertures 96. In the configuration shown in FIGS. 7 and 48, the lock rings may be described as being in their neutral, unlocked, or disconnected configuration. As shown in FIG. 7, passage 116 has a generally elliptical or oval-shaped configuration, with its openings 120 being generally aligned with opening 90. Similarly, FIG. 48 shows lock ring 262 in its neutral configuration, with its openings 120 being generally aligned with opening 90 of female member 260.

To couple male and female members of a quick connect assembly, the tip of the male member is inserted into and through the passage until the lock ring is seated upon a corresponding mount 122 on the shaft, such as shown in FIG. 8. As shown in FIGS. 7–9, mount 122 includes a region 124 of reduced cross-sectional area that is bounded with a region 126 of greater cross-sectional area on at least the side extending toward tip 104. As the tip is inserted into the passage, lock ring 114 deforms from its neutral configuration to a configuration in which passage 116 has a generally circular configuration defined largely by the shape of shaft 102. In this position, a lock ring and assembly may be described as being in an intermediate configuration. More specifically, the female and male members may be frictionally retained together, but the members are not yet locked together to prevent forces upon the upstream or downstream components from causing the members to disconnect from each other, and/or to establish a fluid-tight seal between the members. Although described above with reference to female member 80 and lock ring 114, it should be understood that female member 260 and lock ring 262 may similarly retain a male member.

Lock rings according to the present disclosure, such as rings 114 and 262, are preferably formed from a resilient, yet deflectable, material so that the rings are at all times biased to return toward a neutral configuration. An example of a suitable material is an acetal polymer, such as Delrin® 500, which is sold by DuPont. After region 126 passes through passage 116, the corresponding ring is seated upon region 124, thereby securing the female and male members together. In this position, the lock ring and quick connect assembly may be described as being in their locked configurations. Although not required, it is within the scope of this disclosure that the male and female members may be rotated relative to each other while in this configuration without impairing the fluid-tight seal established by the members and the lock ring.

To disconnect the quick connect assembly, a user depresses the engagement surface of the projecting member (s) to urge the lock ring toward its intermediate configuration, and more specifically, to deflect the lock ring to a configuration in which shaft 102 may be withdrawn through passage 116. Accordingly, projecting members 118 with engagement surfaces 119 may also be referred to as release members or release buttons. After the shaft is removed and the user-imparted forces are removed, the lock ring returns automatically to its neutral configuration.

As discussed, tip 104 of shaft 102 may be beveled. This configuration facilitates the alignment and insertion of the shaft into the corresponding passage of a female member. This configuration may additionally or alternatively be described as enabling the assembly to be secured together without requiring a user to depress members 118 and thereby deform the lock ring so that the shaft may be inserted through passage. Instead, the force of tip 104 being urged against opening 120 of passage 116 deflects the passage to its intermediate configuration, as well as correcting any misalignment of the shaft relative to the passage. As such, such a quick-connect assembly may also be referred to as a plug-in connector, and may be connected and disconnected without requiring a user to use both hands, although two-handed operation is also within the scope of this disclosure. When the male and female members of a quick-connect assembly are adapted to be coupled together merely by inserting the male member into the female member until the lock ring engages and retains the male member, the quick-connect assembly may be described as being configured to automatically couple the members together upon insertion of the male member.

Also shown in FIG. 7 is a seal member 130 in the form of an O-ring 132, which may be used to enhance the fluid seal established by assembly 70. It is within the scope of this disclosure that seal member 130 may take other forms, including being integral with members 80, 82 and/or lock member 112, and that more than one seal member may be used. In the illustrated configuration, shaft 102 includes a channel 134 into which O-ring 132 is seated. It is within the scope of the present disclosure that the O-ring may be seated within female member 80 instead of being mounted on male member 82, that both members may include a seal member, and that neither member may include a seal member other than the mating surfaces of the members themselves. These variations and alternatives apply to all of the O-rings and other seal members described and illustrated herein. Furthermore, it is within the scope of the present disclosure that such seal members may be incorporated into any of the quick-connect assemblies disclosed, illustrated and/or incorporated herein, including the above-described one-button assemblies.

As discussed previously, the male and female members may include end regions 94 that are adapted to removably and repeatedly receive a variety of fluidly interconnected components, such as a length of drink tube, a mouthpiece, etc. Several illustrative configurations have been previously illustrated and/or described, with it being within the scope of the present disclosure that end regions 94 may have any suitable shape, size and/or configuration to establish a fluid-tight, selectively releasable coupling with the structure to be attached thereto. FIGS. 49 and 50 show another example of a suitable configuration for a male member that may form a portion of a quick-connect assembly according to the present disclosure. In FIGS. 49 and 50, the male member is generally indicated at 300 and may be selectively coupled to any of the female members illustrated, described and/or incorporated herein. Similar to male member 82, male member 300 includes a shaft 102 with a tip 104 and a mount 122 for releasably mating with a complementary female portion. Male member defines an internal conduit that forms at least a portion of the fluid conduit 84 defined by the quick-connect assembly. Shaft 102 and mount 122 are schematically illustrated for coupling with female member 80. However, it is within the scope of the present disclosure that male members may be adapted to selectively couple with differently configured female members.

The illustrated embodiment is provided as a non-limiting example to provide an additional graphical illustration that male members according to the present disclosure that include distal regions 94 may include a variety of mounts and configurations. For example, when compared to the male member shown in FIGS. 8 and 9, it can be seen that region 94 of male member 300 includes a mount 302 with a comparably narrower diameter and accordingly may be described as being sized to be fluidly interconnected with tubes or other components that have a smaller internal diameter, or opening, than components that are sized to be mounted on the distal region of the male member illustrated in FIGS. 8 and 9. For example, and as described in more detail herein, many conventional water filters or water purifiers, such as may be used by hikers, campers and the like, utilize inlet and/or outlet tubing that has a narrower inner diameter than is conventionally used for the drink tubing of hydration systems. While this is by no means a requirement, the distal region 94 of FIGS. 49 and 50 provide a graphical example of a male member sized to accommodate this or other tubing or components that have a smaller internal diameter. It is within the scope of the present disclosure that similar variations may be made for larger internal diameter, or larger internal opening, tubing and/or components. Similarly, the dimensions of the end regions may also be shaped to correspond to tubing or components that have non-circular cross-sectional configurations in a direction transverse to the direction of fluid flow.

As illustrated in FIGS. 49 and 50, distal region 94 of male member 300 also provides an example of a mount that includes a plurality of projecting ribs 304 over which the attached tubing or other component extend. Rubs 304 increase the frictional resistance to removal of the attached tubing and thereby resist the unintentional removal of the attached tubing or other components. As a further example, male member 300 may additionally or alternatively include a mount for an exit port, mouthpiece, on/off valve, inline filter, inline pump, and/or other suitable component. In some embodiments, one or more of such components may be integrated with male member 300 or any of the other male members described, illustrated and/or incorporated herein. Similarly, it is within the scope of the present disclosure, that the distal regions and/or integrated components described, illustrated and/or incorporated or utilized herein with respect to a male member or a female member may also be incorporated or utilized with respect to other female and/or male members that are described, illustrated and/or incorporated herein. Therefore, the distal region shown in FIGS. 49 and 50 may be incorporated into a female member without departing from the scope of the present disclosure.

FIGS. 51 and 52 show another embodiment of a male member that is adapted to releasably couple with a corresponding female member. In particular, FIGS. 51 and 52 show male member 320, which includes a mount 122 that is similar to the corresponding mounts of male members 82 and 300. Unlike male members 82 and 300, male member 320 includes a pair of mounts 322 that are configured to receive a length of drink tube or other fluidly interconnected component of a hydration system or associated device. For the purpose of the following discussion, the mounts will be referred to as tubing mounts, but it is within the scope of the disclosure that mounts 322 may be adapted to receive one or more other components, such as mouthpieces, on/off valves, etc.

In the illustrated embodiment, each mount 322 is adapted to fluidly couple to a different length of tubing, which may in turn couple with a component such as an on/off valve, exit port, mouthpiece, pump, filter, etc. Accordingly, each mount is adapted to respectively define a portion, such as portions 324 and 326, of the fluid conduit 84 established by the quick-connect assembly. Each mount 322 includes an opening 92 through which drink fluid may selectively flow, such as into the male member or out of the male member (depending upon the implementation and configuration of the corresponding quick-connect assembly). The size and shape of the respective fluid conduits may be selected to control the relative percentage of fluid that passes through each conduit. Though shown in FIGS. 51 and 52 with two mounts 322, it is within the scope of the present disclosure that three or more mounts may be used. Similarly, the mounts may have different shapes, sizes and/or configurations. Branching mounts may be configured to receive a length of tubing, as shown, or the branching mounts may be configured to directly connect with a corresponding component or otherwise directly integrate with such a component. As the discussed, it with within the scope of the present disclosure that the relative upstream/downstream configuration of the male and female members of a quick-connect assembly may be reversed, it is similarly within the scope of the present disclosure that any of the female members described, illustrated, and/or incorporated herein may be constructed with a plurality of mounts.

As an illustrative example of an application for a quick-connect assembly with a branching male or female member (i.e., a male or female member with an end region 94 that defines two separated fluid openings/conduits), such an assembly may be used to fluidly connect two or more mouthpieces to the same reservoir at the same time. As such, two or more individuals may simultaneously draw drink fluid from the same reservoir. When a male or female member is utilized that includes two or more mounts at one end region of the member, the quick-connect assembly may further include a removable plug that is adapted to be removably and repeatedly used to selectively obstruct the fluid opening of at least one of the mounts. A plug is somewhat schematically illustrated in FIG. 52 at 328.

As discussed previously, a quick connect assembly may include at least one other component of hydration system 10 at least partially integrated therewith. An example of such a configuration is shown in FIGS. 16–21 in which the assembly includes an integrated exit port 30. More specifically, in the illustrated embodiment, male member 82 and exit port 30 have been integrated together. It is within the scope of this disclosure that a female member 80 may alternatively be integrated with exit port 30. Similarly, the following discussion and illustrative figures demonstrate various other embodiments of quick-connect assemblies according to the present disclosure that also include other components and/or specialized mounts integrated therewith. It is within the scope of this disclosure that the illustrative pairings of male and female members with the mounts and/or other integrated components are presented for the purpose of illustrating exemplary configurations and that the pairings may be reversed without departing from the scope of the disclosure.

In FIGS. 22 and 23, male member 82 is shown integrated with a fitting, or mount, 140 that is sized to receive a bite-actuated mouthpiece 44. Mouthpiece 44 is formed from a deformable material, such as silicone, and includes a neck 142 that is stretched around fitting 140. It within the scope of this disclosure that fitting 140 may be integrated with female member 80 instead of male member 82. Similarly, fitting 140 and mouthpiece 44 may have other configurations without departing from the scope of the disclosure.

Figure 24:
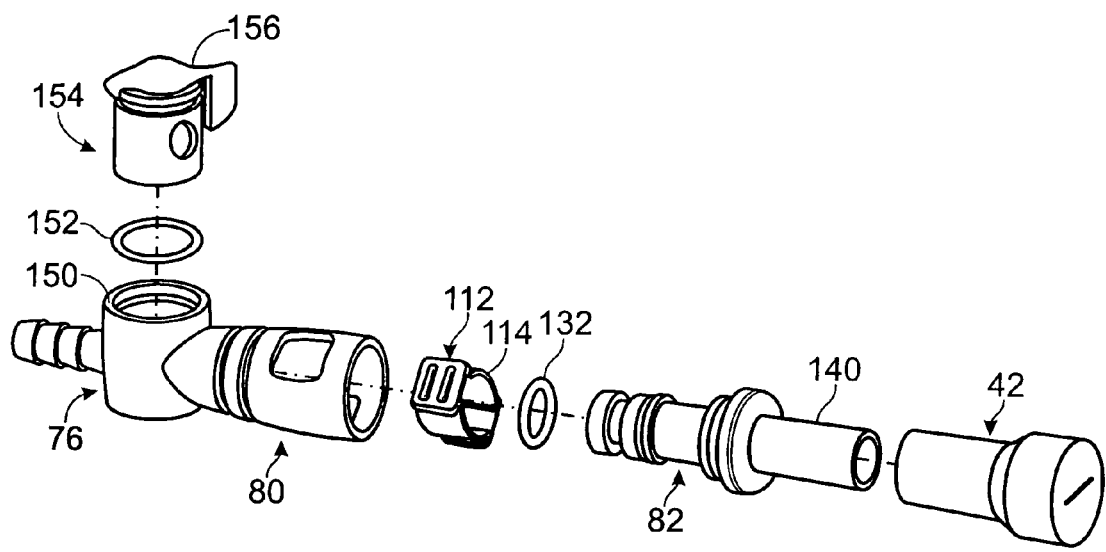
FIG. 24 is an exploded isometric view of a quick-connect assembly with an integrated on/off valve.
Figure 25:
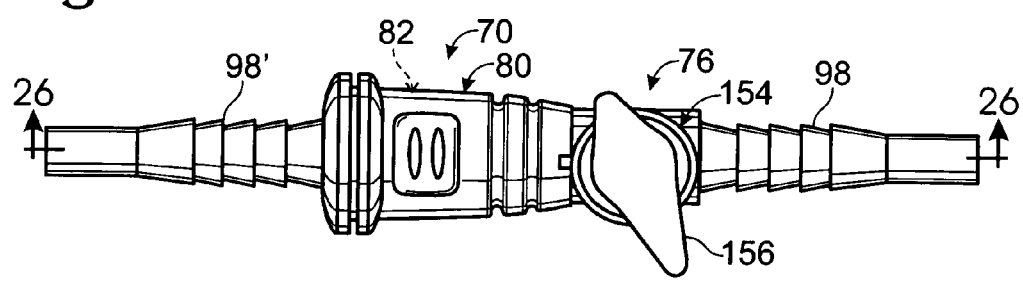
FIG. 25 is a top plan view of the assembly of FIG. 24 with the ends of the assembly adapted to receive lengths of drink tube.
Figure 26:
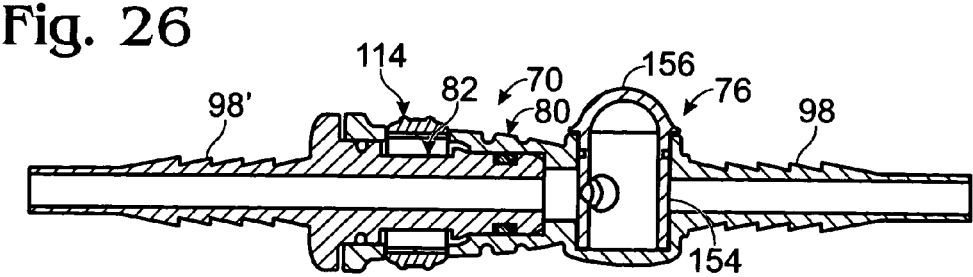
FIG. 26 is a cross-sectional view of the assembly of FIG. 25 taken along the line 26—26 in FIG. 25.

In FIGS. 24–26, female member 80 is shown integrated with on/off valve 76. To illustrate that assembly 70 may include more than one integrated component, in FIG. 24, male member 82 is also shown integrated with a fitting 140 and in FIGS. 25 and 26, male member 82 is also shown integrated with a mount 98. Valve 76 is adapted to obstruct or permit the flow of drink fluid therethrough depending upon the relative configuration of the valve. When the valve is configured to its open (on) configuration, drink fluid may flow through the valve, and when the valve is configured to its closed (off) configuration, the valve blocks fluid conduit 84 so that drink fluid cannot flow through the valve. As shown, valve 76 includes a body 150, a seal member 152 and a rotatable core 154 with a handle, or user-manipulable, portion 156. To configure the on/off valve between its open and closed configurations, a user rotates core 154 relative to body 150, such as by using handle 156. Although not required, on/off valves are typically configured to remain in a user-selected configuration until repositioned by the user. Therefore, unlike a bite-actuated mouthpiece that is biased to automatically return to a closed position, on/off valves typically will remain in a selected open or closed configuration until repositioned by a user.

Figure 27:
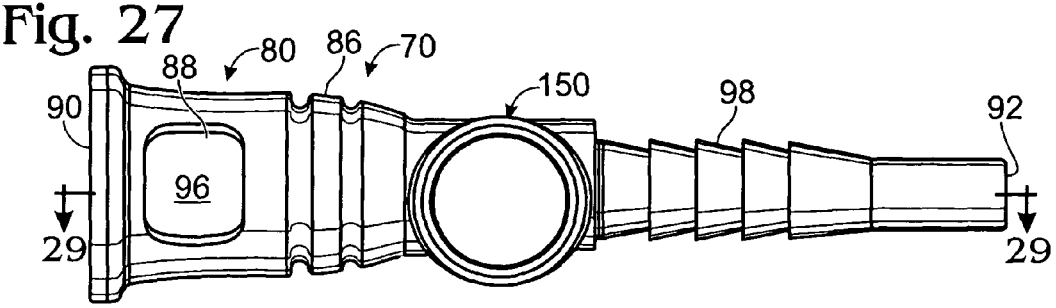
FIG. 27 is a top plan view of the female member and the body of FIG. 24.
Figure 28:
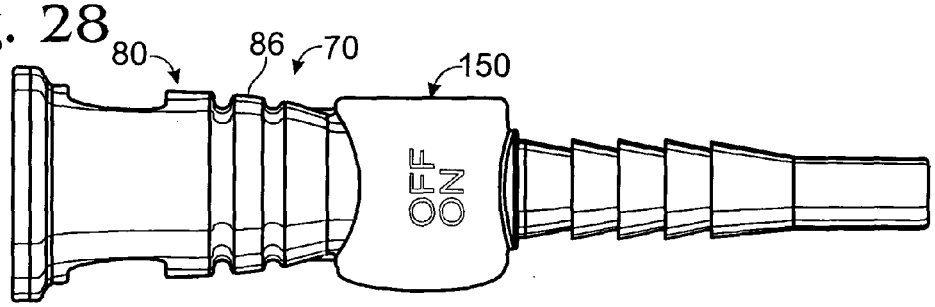
FIG. 28 is a side elevation view of the female member and the body of FIG. 24.
Figure 29:
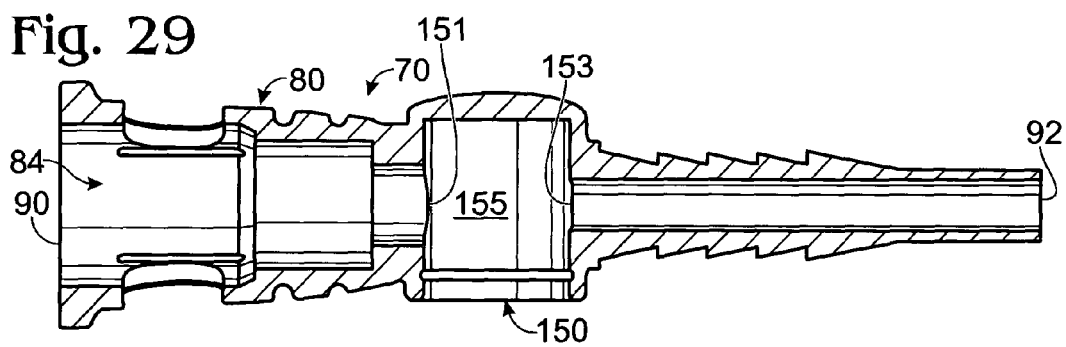
FIG. 29 is a cross-sectional view of the female member and the body of FIG. 24 taken along the line 29—29 in FIG. 27.
Figure 30:
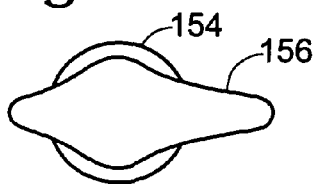
FIG. 30 is a top plan view of the core of the on/off valve of FIG. 24.
Figure 31:
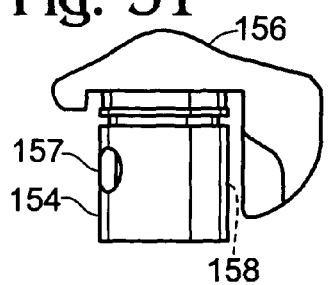
FIG. 31 is a side elevation view of the core of the on/off valve of FIG. 24.

Additional views of female member 80 and body 150 of valve 76 are shown in FIGS. 27–29, and additional views of core 154 are shown in FIGS. 30 and 31. Similar to the previously described quick-connect assemblies, it is within the scope of this disclosure that the on/off valve may be integrated with the male member instead of the female member. As shown with reference to FIGS. 29 and 31, the body 150 of on/off valve 76 includes apertures 151 and 153 through which drink fluid in fluid conduit 84 may flow into and be removed from a chamber, or cavity, 155 into which at least a portion of core 154 extends when the on/off valve is assembled. As shown in FIG. 31, core 154 also includes at least a corresponding pair of apertures 157 and 158 that selectively align with the apertures in the body depending upon the relative rotational position of the core relative to the body. When the apertures at least partially align, drink fluid may flow therethrough, thereby permitting drink fluid to be drawn from the reservoir and dispensed to a user through mouthpiece 42. When the apertures do not overlap, fluid conduit 84 is obstructed and drink fluid cannot flow therethrough.

Figure 32:
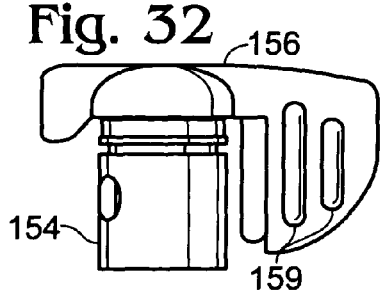
FIG. 32 is a side elevation view of a modified version of the core of the on/off valve of FIG. 24.

Additional examples of suitable on/off valves 76 are disclosed in U.S. Pat. No. 6,497,348, the disclosure of which is hereby incorporated by reference for all purposes. As discussed, hydration systems with quick-connect assemblies according to the present disclosure may be formed with an on/off valve that is not integrated with a quick-connect assembly, and/or without an on/off valve. Similarly, valve 76 may include other suitable configurations for selectively restricting the flow of drink fluid from reservoir 12, such as with core portions that are actuated by mechanisms other than by rotating the core relative to the body of the valve. Even when such a configuration is used, variations to the structure shown in FIGS. 24–31 may be used without departing from the disclosure. For example, core 154 may include a greater or lesser number of apertures. As another example, core 154 may be actuated by a user using a differently configured, or shaped, user-manipulable portion 156. FIG. 32 demonstrates an example of another suitable core 154. As shown, the handle, or user-manipulable portion 156, of the core has been enlarged and includes ribs 159 to enhance gripping of the handle by a user.

Another example of a component that may be attached to tube assembly 34 is a gas mask fitting, which enables a user wearing a gas mask to draw drink fluid from hydration system 10 via a mouthpiece within the gas mask without exposure of the fluid to the external environment. Accordingly, it is within the scope of this disclosure that either the female or male components of quick-connect assembly 70 may include a mount or fitting that is adapted to couple the hydration system with a gas mask's fluid intake tube. It is further within the scope of this disclosure that either of members 80 or 82 may include an integrated gas mask fitting.

Figure 33:
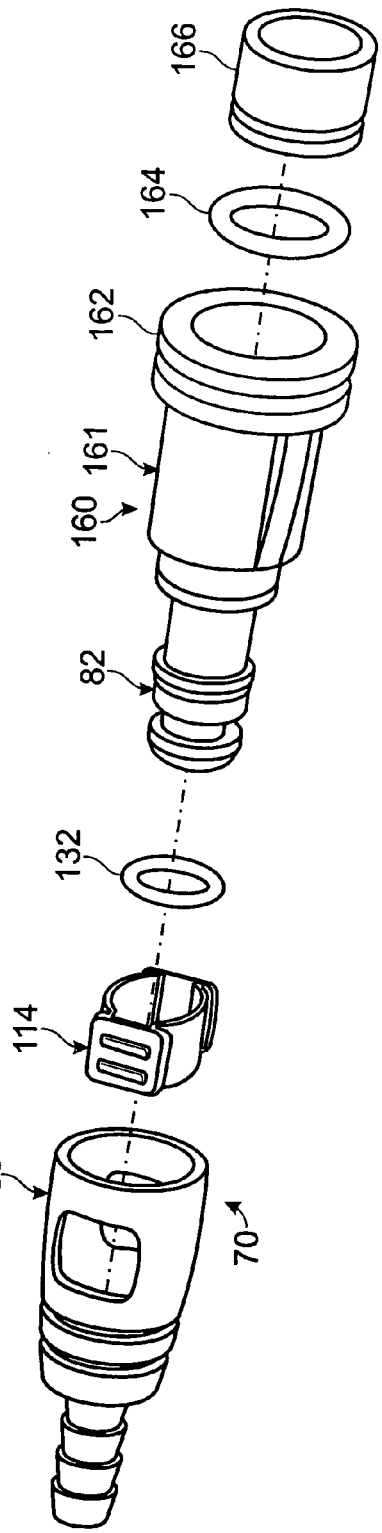
FIG. 33 is an exploded isometric view of a quick-connect assembly with an integrated gas mask fitting.

An example of a quick-connect assembly 70 with an integrated gas mask fitting is shown in FIG. 33. In the illustrated embodiment, the fitting is generally indicated at 161 and is shown integrated with male member 82. It is within the scope of this disclosure, however, that fitting 160 may alternatively be integrated with female member 80 and/or that the fitting may be coupled to one of the previously described and/or illustrated mounts 98. The illustrated embodiment of fitting 160 is adapted for use with an M-40 gas mask, but it is within the scope of this disclosure that the particular size and configuration of fitting 160 may vary to conform with the gas mask with which the fitting will be used. As shown in FIG. 33, fitting 161 includes a housing 162 within which a seal member 164 (such as one or more 0-rings) and a lock ring 166 are retained.

Figure 35:
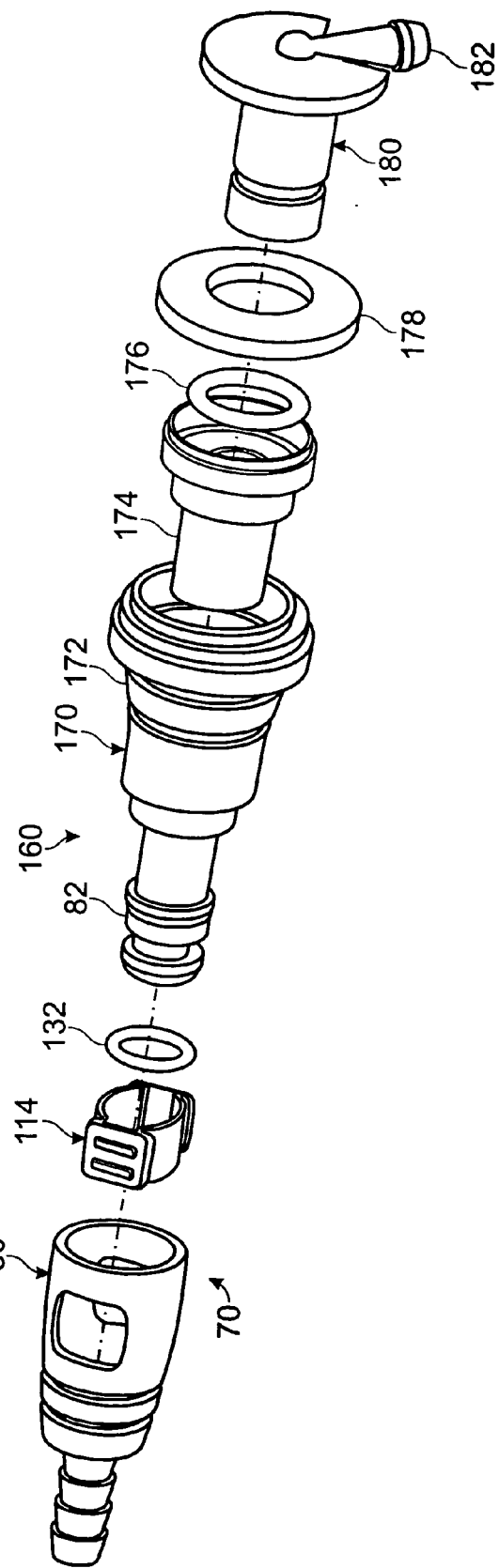
FIG. 35 is an exploded isometric view of a quick-connect assembly with another integrated gas mask fitting.
Figure 34:
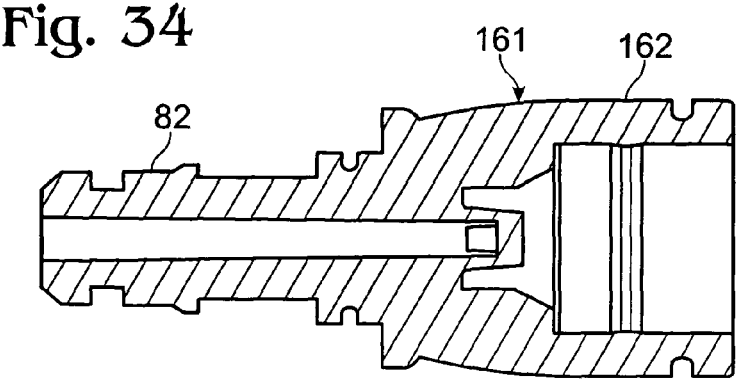
FIG. 34 is a cross-sectional view of the male member of the quick-connect assembly and the gas mask fitting of FIG. 33.
Figure 36:
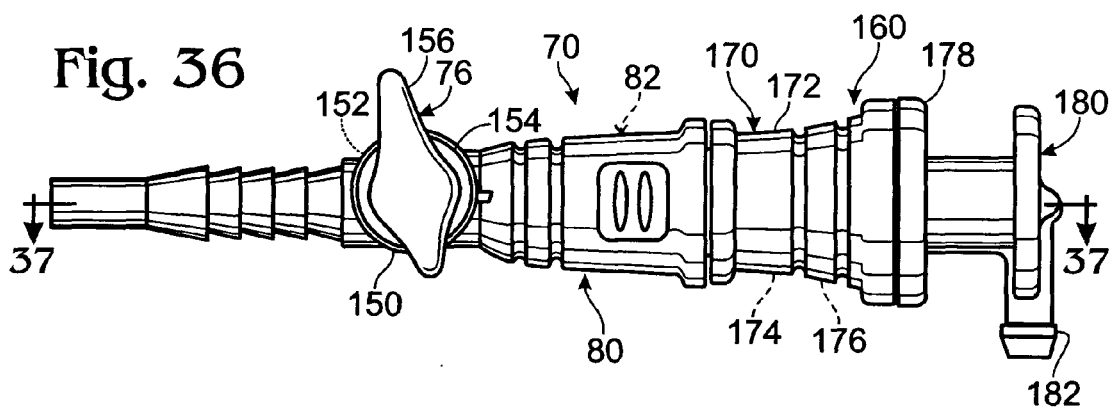
FIG. 36 is a side elevation view of the assembly and the fitting of FIG. 35 further including an on/off valve.
Figure 37:
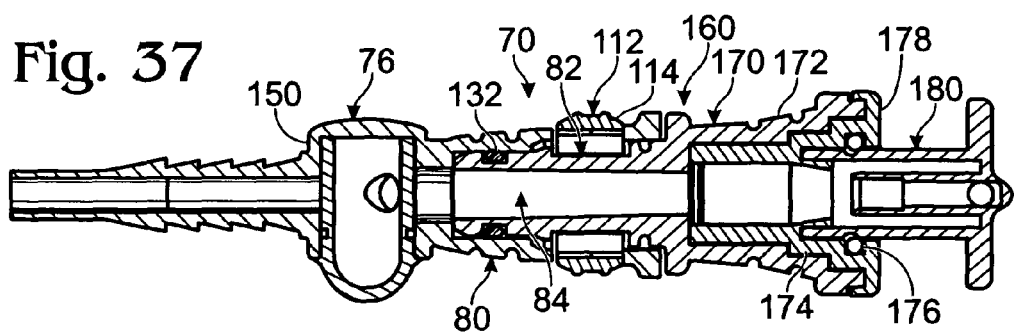
FIG. 37 is a cross-sectional view of the assembly and the fitting of FIG. 35 taken along the line 37—37 in FIG. 36.

In FIG. 35, another assembly is shown with an integrated gas mask fitting 160, which is generally indicated at 170. Fitting 170 is configured for use with AVON™ brand gas masks and includes a housing 172, an insert 174 and a seal member (such as one or more O-rings) 176, which are secured within the housing by a retainer 178. Also shown in FIG. 35 is a coupling member 180 with an output port 182 that is adapted to connect to the fluid-intake tube of a gas mask. Fittings 160 may also include a valve assembly that is adapted to automatically stop the flow of fluid therethrough when the fitting is not coupled to a gas mask's fluid-intake tube. In FIGS. 36 and 37, assembly 70 is shown including both a gas mask fitting and an on/off valve 76 to provide further examples of a quick-connect assembly with more then one integrated component.

Figure 38:
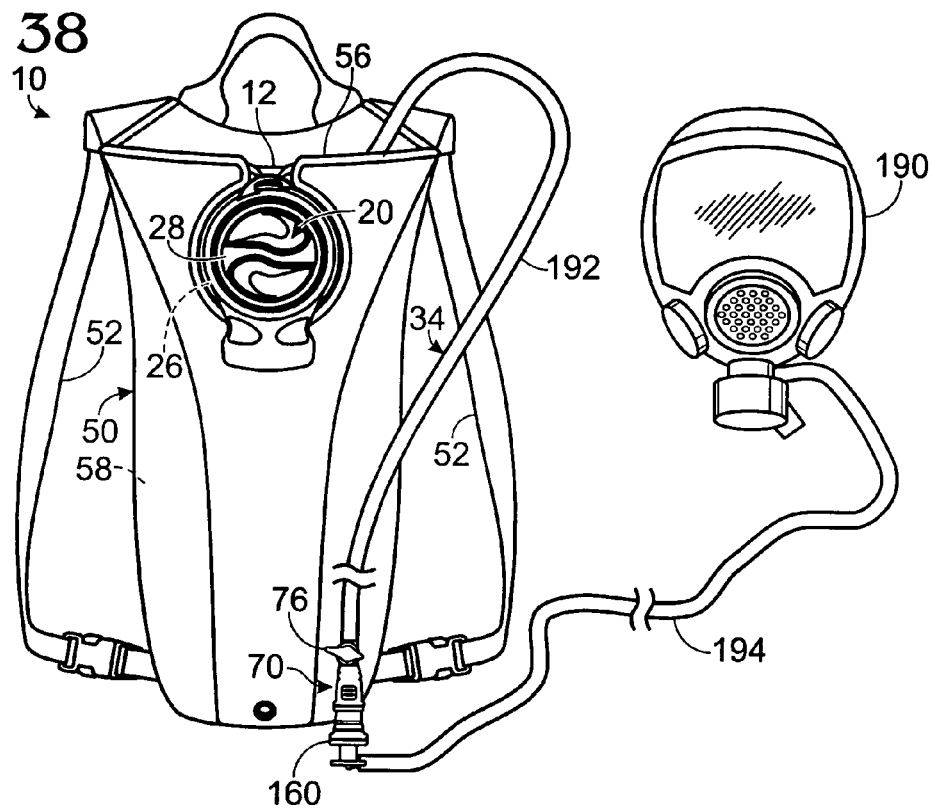
FIG. 38 is a side elevation view of a hydration system that includes a quick-connect assembly according to the present disclosure and which is fluidly interconnected with a gas mask.

FIG. 38 provides an example of a hydration system 10 that includes a quick-connect assembly 70 with an integrated gas mask fitting 160 and which is fluidly interconnected with a gas mask 190. It should be understood that gas mask 190 has been somewhat schematically illustrated in FIG. 38 and that mask 190 is intended to graphically represent any suitable gas mask, including gas masks that cover primarily a user's nose and mouth, gas masks that cover a user's face, and gas masks that cover a user's entire head. Regardless of the configuration, mask 190 is adapted to provide drink fluid from reservoir 12 to the user's mouth without exposing the drink fluid to the environment outside of the hydration system and gas mask. In the illustrated embodiment, tube assembly 34 may be described as including a length 192 of flexible tubing that fluidly interconnects the exit port of the hydration system's reservoir with quick-connect assembly 70 and a length 194 of tubing that fluidly interconnects assembly 70 and gas mask 190. Length 194 may be the intake tube of the gas mask or may be fluidly interconnected with the intake tube of the gas mask. Each of these lengths of tubing may be comprised of one or more fluidly interconnected tube portions.

As discussed, hydration systems that include quick-connect assemblies enable components of the hydration system to be quickly and fluidly interconnected together or released from an existing fluid interconnection. As the preceding drawings demonstrate, it is within the scope of this disclosure that at least one of the male or female members of quick-connect assemblies according to the present disclosure may be configured to establish fluid communication with a plurality of different components and/or accessories of the hydration system and that the members may even include these components and/or accessories integrated therewith.

As an illustrative example, consider a hydration system that includes a quick-connect assembly that fluidly interconnects the drink tube of the hydration system with a mouthpiece or other suitable outlet for the drink fluid that is drawn from the reservoir. More specifically, the assembly will include a first member (such as either one of the previously described and/or illustrated male or female members) that includes a mount upon which the drink tube is mounted. To that member, a variety of components can then be quickly fluidly interconnected simply by mounting the component(s) to the corresponding mount of a second, complimentary connector member and/or utilizing a second, complimentary connector member that contains an integrated component. Continuing this example, assuming that the first member is female member 80, any number of complimentary (sized and shaped to be coupled to the female member by lock member 112) male members 82 may be interchangeably and fluidly secured thereto. Illustrative examples of these male members include a male member with an attached or integral mouthpiece, another male member with an attached or integral mouthpiece (such as for use by a different user or if the first mouthpiece is dirty), a male member containing an on/off valve, a male member with a fitting adapted to receive an additional length of tube assembly, a male member with a gas mask adapter, a male member connected to a filter, a male member connected to a pump, a male member connected to a refill reservoir, etc.

As discussed, quick-connect assemblies according to the present disclosure, such as may include any of the male, female and lock members described, illustrated and/or incorporated herein, may be used to selectively and fluidly interconnect various components of a hydration system. In the previously illustrated embodiments, examples of quick-connect assemblies have been illustrated that fluidly interconnect components of the hydration system between the fluid reservoir and the mouthpiece, or other fluid outlet, of the hydration system. It is also within the scope of the disclosure that quick-connect assemblies may be used to selectively and repeatedly fluidly interconnect the hydration system with other functional accessories and/or devices.

For example, in some applications it may be desirable to filter and/or purify the water or other drink fluid that is dispensed by the hydration system. Accordingly, quick-connect assemblies may be utilized to fluidly couple the reservoir of a hydration system to a filter, such as schematically illustrated in FIG. 53. In FIG. 53, and the subsequently discussed FIGS. 54 and 55, reference numerals 10, 12 and 70 used to schematically depict any hydration system, fluid reservoir and quick-connect assembly within the scope of the present disclosure. In FIG. 53, reference numeral 340 schematically depicts any suitable structure and/or device for filtering and/or purifying the drink fluid to be dispensed by reservoir 12. Filter 340 may utilize any suitable chemical and/or physical mechanism for removing impurities from the drink fluid.

Filter 340 may be a gravity-operated filter, or it filter may include a pump or other suitable mechanism, such as indicated in dashed lines in FIG. 53 at 342, for pumping or otherwise conveying the drink fluid. Filter 340 may be used to filter the drink fluid as it is dispensed from the reservoir, such as by a user sucking on the mouthpiece or other outlet of the tube assembly to draw the drink fluid through the tube assembly and filter. Additionally or alternatively, filter 340 may be used to filter water or other drink fluid that is delivered into the reservoir via the tube assembly, such as discussed in more detail herein.

When filter 340 is used to filter drink fluid that is being delivered to the reservoir via tube assembly 34, this configuration offers a potential benefit that the drink fluid is delivered into the reservoir without requiring the fill port of the reservoir to be opened or unsealed, and thereby providing an opportunity for the reservoir to be contaminated or otherwise receive unintended materials therein. Quick-connect assembly 70 may be used to easily connect filter 340 to the reservoir when filtering is desired, and to easily disconnect the filter after the desired filtering has been completed.

FIG. 54 schematically depicts a hydration system 10 that includes a quick-connect assembly 70 that fluidly couples reservoir 12 with a pump, which is schematically illustrated at 350. Pump 350 may be a manually operated pump or a pump that is powered by electricity, chemical fuel, or another suitable energy source. Manually operated pumps may include any suitable piston, bellows, compressible bulb or other mechanism for selectively causing the flow of drink fluid.

Pump 350 may be used to pump drink fluid into or out of reservoir 12. For example, water or other drink fluid may be pumped into the reservoir in order to fill the reservoir. An illustrative example of where such a configuration may be desirable is when the reservoir is housed within a pack and/or user's garment and it is desirable to fill the reservoir without removing (and optionally, even accessing) the reservoir from the pack and/or garment. The use of a pump to fill the reservoir via the drink tube may enable the reservoir to be (re)filled without having to access the fill port, remove the filler cap, etc. As another illustrative application, the pump may be used to remove drink fluid from the reservoir without requiring a user to suck the drink fluid out of the reservoir through the drink tube, compress the reservoir to urge the drink fluid through the drink tube, or open the cap of the fill port and pour the drink fluid from the fill port. As mentioned above, filter 340 also may include a pump, such as pump 350. When present together, these components may be integrated within a common housing or may be separate components that are in fluid communication with each other.

FIG. 55 schematically depicts a hydration system 10 that includes a quick-connect assembly 70 adapted to fluidly interconnect the tube assembly of the hydration system with another, typically larger volume, reservoir, which is schematically illustrated at 360 and which may be referred to as a refill station, filling station, or "water buffalo." Similar to the above discussion relating to pump 350, this configuration enables the reservoir to be re(filled) with drink fluid without removing the reservoir from the pack or garment in which it is located. It also may be utilized to (re)fill the reservoir without exposing the drink fluid to the environment, as would normally occur if drink fluid was poured into an open fill port of a conventional reservoir. Refill station 360 typically will be adapted to selectively dispense sufficient drink fluid to fill more than one reservoir 12, and preferably may be adapted to fill at least 10 or more reservoirs. For example, refill station 360 may be a 5 gallon, 10 gallon, 20 gallon, or even larger fluid reservoir. Refill station may store the drink fluid under pressure, may include a pump to selectively dispense the drink fluid to the reservoirs, may be in fluid communication with a pressurized source of drink fluid, and/or may be utilized with a pump, such as pump 350. In some embodiments, refill station 360 may take the form of a renewable fluid source, such as a station that is plumbed to a clean water supply. In some embodiments, refill station 360 may be thermally controlled, so that fluid contained by the reservoir is delivered at a desired temperature, or within a desired range of temperatures.

Refill stations for hydration systems may have particular utility in sports, law enforcement, military, and/or other situations in which two, and often many more, users are participating in strenuous activity and need to refill, or recharge, their reservoirs rather quickly and preferably without having to remove the reservoirs from their packs/garments, open the fill ports, etc. A refill station may be configured so that only one reservoir may be refilled from the refill station at a given time, or a refill station may be configured so that two or more reservoirs may be simultaneously refilled, such as by using a quick-connect assembly with a version of the above-discussed branched end regions and/or by having more than one (preferably valved) outlet to which tube assemblies may be fluidly coupled.

Similar to the example provided above with reference to a filter, a user may use a quick connect assembly to fluidly couple reservoir 12 to the refill station, such as by having one member of the quick-connect assembly mounted on an end of the hydration system's tube assembly and the other (mating) member of the quick-connect assembly mounted on or otherwise coupled to the refill station. After the reservoir has been charged, the user can quickly disconnect the reservoir from the refill station and reconnect the mouthpiece, gas mask adapter or other downstream component to the quick-connect assembly, with this component preferably including a compatible male or female member for the component of the quick-connect assembly that is mounted on the end of the tube assembly. When the hydration system includes an on/off valve (either integrated with the quick-connect assembly or simply in fluid communication therewith, the valve may be turned to an off position to prevent fluid from undesirably flowing out of the reservoir before the user reconnects a mouthpiece.

Although FIGS. 53–55 graphically depict the reservoir, quick-connect assembly and filter/pump/refill station being interconnected by lengths of tubing, it is within the scope of the present disclosure that two or more of these components may be directly coupled together by a quick-connect assembly, and/or even include an integrated male or female member of a quick-connect assembly. Typically, the hydration system will still include at least one length of drink tubing, with this length extending from the exit port of the reservoir.

Figure 39:
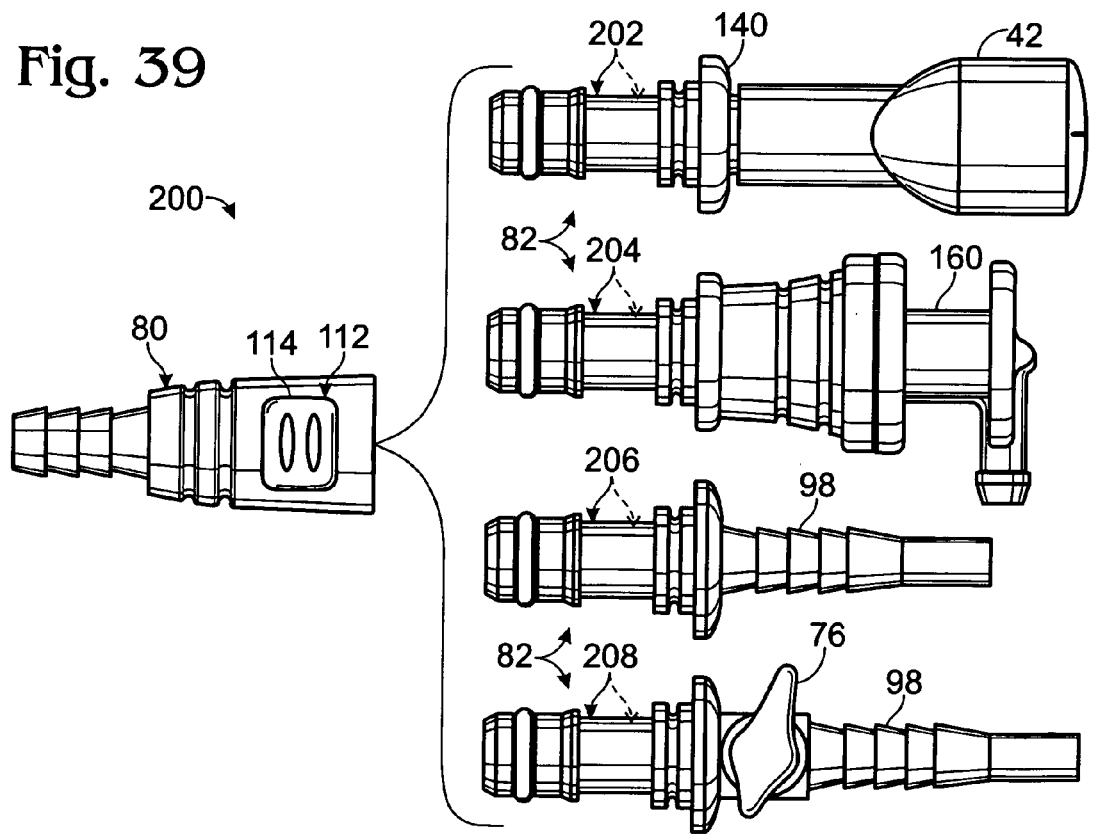
FIG. 39 is an isometric view showing an illustrative quick-connect kit according to the present disclosure.

A quick-connect assembly having at least one male or female member and a plurality of complimentary members may be referred to as a quick-connect kit, in that a user can selectively interconnect the components depending upon the user's preferences and desired application of the hydration system. An example of such a quick-connect kit is shown in FIG. 39 and generally indicated at 200. As shown, kit 200 includes a female member 80 and a plurality of male members 82, with at least one of the male members typically having a different mount or integrated component than the others. In the illustrated embodiment, the male members include a member 202 having a fitting 140 for a mouthpiece 42, a member 204 having a fitting 160 for a gas mask, a member 206 having a mount 98, which in the illustrated embodiment is barbed, and a member 208 having an on/off valve 76. It is within the scope of this disclosure that quick-connect kits 200 may include some or all of these illustrative combinations of male and female members. It is further within the scope of this disclosure that kit 200 may include more than one of a particular type of member and/or one or more members that differ from those illustrated in FIG. 39.

As discussed herein, hydration systems 10 with quick-connect assemblies 70 according to the present disclosure may be used for a variety of applications, including sporting applications, recreational applications, industrial applications, and military/law enforcement applications. In applications where the hydration system is configured for use with gas masks or otherwise expected to be exposed to harmful chemical agents, it may be desirable for at least a portion of the hydration system to be resistant to chemical agents, such as mustard (HD) blister agent and sarin (GB) nerve agent. Mustard blister agent is a non-volatile, very caustic substance that is effective at penetrating many materials. Mustard vapor can produce skin irritation (erythema) at dosages of approximately 100 mg-min/m$^3$. Sarin nerve agent is a volatile material that is effective at migrating through pores and other apertures or gas-permeable openings in materials. Sarin vapor can incapacitate an individual at dosages of approximately 8000 mg-min/m$^3$. Sarin and mustard agents are not exclusive of the chemical agents to which hydration systems according to the present disclosure may be constructed to be resistant. However, the combination of the penetrating ability of mustard agent and the migratory ability of sarin agent collectively form an effective test for most chemical agents. In other words, materials that are sufficiently chemically resistant to both mustard and sarin agents are typically sufficiently chemically resistant to other chemical agents, such as anthrax, small pox and the like.

Preferably, the chemically resistant components of the hydration system are constructed to meet, and preferably exceed, the chemical penetration standards established by the U.S. Army Center for Health Promotion and Preventative Medicine (CHPPM). Expressed in terms of the amount of nerve agent ingested by a user drinking fifteen liters of drink fluid per day (with a seven day maximum), these maximum standards may be expressed as 0.047 mg/L of mustard agent and 0.0093 mg/L of sarin agent. When tested, it is preferable that the chemically resistant components of hydration system 10 prevent the above-identified maximum acceptable amounts of these agents from passing therethough when exposed to the agents in lethal concentrations (such as 10 g/m$^2$ of each agent) for at least 24 hours. Even more preferably, the components prevent even 50%, 60% or 75% of the CHPPM standards from being reached.

Preferably, the entire hydration system, as assembled for use, is resistant to these chemical agents so that drink fluid may be stored in reservoir 12 and selectively dispensed to a user through tube assembly 34 and any associated components without the drink fluid being contaminated by the chemical agents. By "as assembled for use," it is meant that portions of the hydration system that are enclosed by sufficiently chemically resistant materials may themselves be formed from materials, or otherwise be constructed, such that they are not themselves sufficiently chemically resistant. For example, an illustrative, schematic component of a hydration system is shown in FIG. 40 and indicated generally at 220. As shown, component 220 is depicted as a length of flexible drink tube, such as may be utilized in tube assembly 34. In FIG. 40, component 220 is entirely formed from one or more materials 222 that meet or exceed the CHPPM (or other selected) standards for one or more selected chemical agents in the composition and construction present in the hydration system. By this it is recognized that the chemical resistance of a material is at least partially defined by the material's composition and by the thickness of the material. Therefore, a material that is sufficiently chemically resistant to sarin and mustard agents, for example, when present in a first thickness may not be sufficiently chemically resistant if the thickness is reduced.

Illustrative, non-exclusive examples of chemically resistant materials for constructing components of hydration system 10 include thermoset epoxies such as vulcanized butyl rubber and chloro-isobutene-isoprene rubber (chlorobutyl), thermoplastic elastomers such as SentopreneTM rubber, nylon, ABS, polyurethane, polypropylene, polyethylene. The choice of materials for a particular component include considerations of the expected forced to be applied to the component, structural requirements, and flexibility requirements, and accordingly may vary from component to component and system to system.

It is within the scope of this disclosure that chemically resistant components of a hydration system may include a chemically resistant cover, or sheath, that is applied over a structure that is not, or not sufficiently, chemically resistant. For example, in FIG. 41, a portion of tube assembly 34 is shown encased within a cover, or sheath, 224 that is formed from one or more chemically resistant materials 222. Collectively, the sheathed tube assembly provides another example of a chemically resistant component 220. More specifically, although tube assembly 34 may not be sufficiently chemically resistant, the assembled component 220 is sufficiently chemically resistant because sheath 224 prevents the chemical agents from reaching tube assembly 34. The sheath may be permanently bonded or otherwise applied to the component or removably mounted on the component.

It is also within the scope of this disclosure that the preceding discussion applies to other flexible components of the hydration system (such as reservoir 12, some mouthpieces 42 and some exit ports 30) and other more rigid components of the hydration system (such as some exit ports 30, on/off valve 76, quick-connect assembly 70, gas mask fittings 160 and some mouthpieces 42). In FIG. 42, examples of these and other suitable constructions for chemically resistant components of a hydration system are schematically illustrated. As shown, each illustrative, fragmentary component includes an exterior surface 230 that is oriented to be contacted by external chemical agents to which the hydration system is exposed, and an internal surface 232 that is oriented to contact drink fluid within the hydration system. In FIG. 42, reference numeral 240 schematically depicts a component that is entirely formed from a chemically resistant material, and reference numeral 242 schematically depicts a component that includes an outer covering or sheath 224 that is formed from a chemically resistant material. It may be desirable to include an underlying coating or fluid barrier 246 with some chemically resistant materials to prevent the materials from affecting the taste of the drink fluid carried in the hydration system. For example, vulcanized butyl rubber tends to negatively affect the taste of water or other drink fluids and therefore, a waterproof barrier 246 may be used to preserve the original taste of the drink fluid when vulcanized butyl rubber is used as chemically resistant material 222. This construction is schematically illustrated at 246 in FIG. 42. Barrier 246 may take any suitable form, such as being a film, coating, sheet, independent layer, etc. As yet another example, and as schematically illustrated at 250, a chemically resistant component 220 may be formed from a plurality of layers that collectively provide a chemically resistant composite, even if one or more of the layers (or even each of the individual layers) is not chemically resistant.

In FIG. 43, a less schematic example of chemically resistant components 220 is provided. As shown, tube assembly 34 (including tube portions 192 and 194) and a quick connect assembly 70 with an on/off valve 76 and a gas-mask fitting 160 are all fluidly interconnected and each of these components is formed from at least one chemically resistant material 222.

The portion of a hydration system to be formed from chemically resistant materials depends to some degree upon the intended environment and method of using the hydration system. Of course, in many applications, such as sporting and recreational applications, none of the hydration systems components need to be constructed of these materials. In applications where there is reasonable risk of exposure to chemical agents, the most protective design is for the entire hydration system (reservoir, exit port, tube assembly, mouthpiece, quick-connect assembly, and any additional components) be constructed from chemically resistant materials so that the drink fluid is protected while stored and dispensed regardless of any other protective measures employed by a user.

An illustrative, non-exclusive example of an disclosure according to the present disclosure is a personal hydration system that includes at least (1) a reservoir having a body portion with an internal compartment adapted to receive a volume of drink fluid and a selectively sealable fill port having an opening through which drink fluid may be added to or removed from the compartment; (2) an elongate downstream assembly extending in fluid communication from the reservoir to define a fluid conduit through which drink fluid may flow from the compartment for drinking by a user, wherein the downstream assembly comprises a plurality of fluidly interconnected components selected from the group consisting of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downstream assembly and the reservoir to permit drink fluid to be drawn from the compartment into the downstream assembly, and a gas mask fitting adapted to fluidly interconnect the quick-connect assembly with an intake tube of a gas mask, and further wherein the downstream assembly further includes at least one quick-connect assembly adapted to fluidly interconnect at least two of the plurality of components, wherein the quick-connect assembly includes at least (3) a male coupling member having a shaft that includes a tip and which defines at least a portion of the fluid conduit, wherein the male coupling member includes a region distal the tip with a port through which drink fluid may selectively flow into or out of the assembled quickconnect assembly; (4) a female coupling member having a body with an opening sized to receive at least the tip of the male coupling member, wherein the opening is in fluid communication with a cavity that extends through the female coupling member to a region distal the opening that includes a port through which drink fluid may selectively flow into or out of the assembled quick-connect assembly; and (5) a resilient lock ring coupled to the female coupling member and adapted to selectively engage prevent removal of the shaft of the male coupling member when the shaft of the male coupling member is at least partially inserted into the passage, wherein the lock ring defines a passage and is selectively deformable between an unlocked orientation, in which the tip of the male coupling member may pass through the passage, and a locked orientation, in which the tip of the male coupling member may not pass through the passage, and further wherein the lock ring is biased to the locked configuration.

As another non-exclusive example, the present disclosure is also directed to a quick-connect kit for forming an assembled quick-connect assembly that defines a fluid conduit through which drink fluid may flow, with the kit including (1) at least one male coupling member having a shaft that includes a tip and which defines at least a portion of a fluid conduit, wherein the male coupling member includes a region distal the tip with a port through which drink fluid may selectively flow into or out of the assembled quick-connect assembly, and further wherein the region includes a mount; (2) at least one female coupling member having a body with an opening sized to receive at least the tip of a male coupling member, wherein the opening is in fluid communication with a cavity that extends through the female coupling member to a region distal the opening that includes a port through which drink fluid may selectively flow into or out of the assembled quick-connect assembly, wherein the region includes a mount; and (3) a lock member adapted to releasably and fluidly interconnect a male coupling member and a female coupling member, wherein the lock member is selectively configured between a locked configuration, in which the lock member is configured to retain the male and the female coupling members in fluid interconnection with each other, and an unlocked configuration, in which the lock member is configured to permit the male coupling member to be selectively removed from and inserted into the passage of the female coupling member; with the mount of a first one of the male and the female coupling members adapted to be fluidly interconnected with a tube assembly of a hydration system upstream from a second one of the male and the female coupling members, and with the kit including at least a pair of the second one of the male and the female coupling members, with the mount of one of the second one of the male and the female coupling members adapted to fluidly interconnect the assembly with at least one of a length of drink tubing and a mouthpiece and the mount of the other of the second one of the male and the female coupling members adapted to fluidly interconnect the assembly with an intake tube of a gas mask, and furthermore upon configuring the lock member to its unlocked configuration, the second ones of the male and the female coupling members may be selectively and interchangeably fluidly interconnected with the first one of the male and the female coupling members.

As yet another example, the present disclosure is directed to personal hydration systems and/or gas masks that include such a kit.

As still another example, the present disclosure is directed to chemically resistant hydration systems that include at least (1) a reservoir having a body portion with an internal compartment adapted to receive a volume of drink fluid and a selectively sealable fill port having an opening through which drink fluid may be added to or removed from the compartment; and (2) an elongate downstream assembly extending in fluid communication from the reservoir to define a fluid conduit through which drink fluid may flow from the compartment for drinking by a user, wherein the downstream assembly comprises a plurality of fluidly interconnected components selected from the group consisting of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downstream assembly and the reservoir to permit drink fluid to be drawn from the compartment into the downstream assembly, and a gas mask fitting adapted to fluidly interconnect the quick-connect assembly with an intake tube of a gas mask, and further wherein the downstream assembly further includes at least one quick-connect assembly adapted to fluidly interconnect at least two of the plurality of components, and further the plurality of fluidly interconnected components are adapted to be chemically resistant, such that drink fluid may remain in the downstream assembly when the downstream assembly is exposed to a chemical agent present in a concentration of at least 10 $g/m^2$ without more than a maximum acceptable amount of the chemical agent penetrating the downstream assembly and contacting the drink fluid. Illustrative examples of these chemical agents include mustard blister agent and/or sarin nerve agent. Illustrative maximum acceptable amounts of mustard blister agent include 0.047 mg/L, 0.003525 mg/L and 0.00235 mg/L. Illustrative maximum acceptable amounts of sarin blister agent include 0.0093 mg/L, 0.006975 mg/L and 0.00465 mg/L.

INDUSTRIAL APPLICABILITY

The present disclosure is applicable in any hydration system in which drink fluid is provided to a user. The disclosure is particularly useful with personal hydration systems in which drink fluid is carried by a user in a fluid reservoir and delivered for drinking to a user via a mouthpiece that is fluidly connected to the reservoir by a drink tube. Embodiments of the present disclosure are also applicable to personal hydration systems that are selectively configured for use by users wearing gas masks.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one or more of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A personal hydration system kit, comprising:
   a reservoir having a body portion with an internal compartment adapted to receive a volume of drink fluid, wherein the reservoir includes a selectively sealable fill port having an opening through which drink fluid may be added to or removed from the compartment; and
   an elongate downstream assembly extending in fluid communication with the reservoir to define a fluid conduit through which drink fluid may be drawn from the compartment for drinking by a user, wherein the downstream assembly comprises a plurality of fluidly interconnected components selected from the group consisting of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downstream assembly and the reservoir to permit drink fluid to be drawn from the compartment into the downstream assembly, a gas mask fitting adapted to fluidly interconnect a quick-connect assembly with an intake tube of a gas mask; a filter adapted to selectively remove impurities from the drink fluid flowing therethrough, a refill station adapted to deliver drink fluid to the reservoir through the downstream assembly, and a pump adapted to selectively propel drink fluid through the downstream assembly, and further wherein the downstream assembly further includes at least one quick-connect assembly kit adapted to fluidly interconnect at least two of the plurality of components, wherein the quick-connect assembly kit comprises:
      at least one male coupling member having a shaft that includes a tip and which defines at least a portion of a fluid conduit, wherein the male coupling member includes a region distal the tip with a port through which drink fluid may selectively flow into or out of the assembled quick-connect assembly, and further wherein the region includes a mount;
      at least one female coupling member having a body with an opening sized to receive at least the tip of a male coupling member, wherein the opening is in fluid communication with a cavity that extends through the female coupling member to a region distal the opening that includes a port through which drink fluid may selectively flow into or out of the assembled quick-connect assembly, wherein the region includes a mount;
      a lock member adapted to releasably and fluidly interconnect a male coupling member and a female coupling member, wherein the lock member is selectively configured between a locked configuration, in which the lock member is configured to retain the male and the female coupling members in fluid interconnection with each other, and an unlocked configuration, in which the lock member is configured to permit the male coupling member to be selectively removed from and inserted into the cavity of the female coupling member,
      wherein the mount of a first one of the male and the female coupling members is adapted to be fluidly interconnected with a first one of the plurality of components upstream from a second one of the male and the female coupling members, and further wherein the kit includes at least a pair of the second one of the male and the female coupling members, with the mount of one of the second one of the male and the female coupling members being adapted to fluidly interconnect the assembly with at least a second one of the plurality of components, and
      further wherein the lock member includes a resilient lock ring adapted to be housed within the female coupling member and including a passage that extends through the lock ring, wherein the lock ring is adapted to selectively engage and prevent removal of the shaft of the male coupling member when the shaft of the male coupling member is at least partially inserted into the passage, wherein in the unlocked configuration the passage is configured to permit the tip of the male coupling member to pass through the passage, wherein in the locked configuration the passage is configured to permit the tip of the male coupling member to enter the passage but to restrict the tip of the male coupling member from passing through the passage, and
      further wherein upon configuring the lock member to its unlocked configuration, the second one of the male and the female coupling members may be selectively and interchangeably fluidly interconnected with the first one of the male and the female coupling members.

2. The kit of claim 1, wherein the lock member is biased to the locked configuration.

3. The kit of claim 1, wherein the lock member is adapted to engage a portion of the male coupling member that is inserted into the opening and prevent removal of the portion of the male coupling member from the opening.

4. The kit of claim 3, wherein the lock member includes at least one release member adapted to configure the lock member to release the portion of the male coupling member upon receipt of a user-applied force to the release member.

5. The kit of claim 4, wherein the at least one female coupling member includes at least one aperture through which the at least one release member at least partially extends.

6. The kit of claim 5, wherein the at least one release member is biased to extend at least partially through the aperture, and further wherein upon urging of the release member into the aperture, the lock member is urged to a configuration in which the portion of the male coupling member is released for removal from the opening.

7. The kit of claim 6, wherein the at least one release member projects from the lock ring, and further wherein the lock member is configured to the unlocked configuration when the release member is urged generally toward the lock ring.

8. The kit of claim 7, wherein the lock member includes a single release member.

9. The kit of claim 8, wherein the lock member further includes a projection that extends from the lock ring and which is adapted to be engaged by a mount associated with the female coupling member to position the lock ring within the female coupling member.

10. The kit of claim 7, wherein the lock member includes a pair of generally opposed release members.

11. The kit of claim 10, wherein the female coupling member includes a pair of apertures through which the pair of release members at least partially extend.

12. The kit of claim 7, wherein the female coupling member further includes a guard that extends at least partially around the at least one aperture and projects from the body of the female coupling member to restrict unintentional urging of the lock member to the unlocked configuration.

13. The kit of claim 1, wherein at least one of the female coupling member and the male coupling member shares a common housing with at least one of the plurality of components.

14. The kit of claim 1, wherein at least one of the female coupling member and the male coupling member includes at least one of the plurality of components integrally formed therewith.

15. The kit of claim 1, wherein the kit further includes at least three of the second one of the male and the female coupling members.

16. The kit of claim 1, wherein at least one of the second one of the male and the female coupling members includes an on/off valve adapted to selectively obstruct the fluid conduit to prevent drink fluid from flowing therethrough.

17. The kit of claim 1, wherein at least one of the second one of the male and the female coupling members includes a barbed mount adapted to receive a length of drink tubing.

18. The kit of claim 1, wherein at least one of the second one of the male and the female coupling members includes a mouthpiece.

19. The kit of claim 1, wherein at least one of the second one of the male and the female coupling members includes a fitting adapted to receive a mouthpiece.

20. The kit of claim 1, wherein at least one of the second one of the male and the female coupling members includes a fitting adapted to receive a length of tubing in fluid communication with a filter.

21. The kit of claim 1, wherein the first and the second ones of the plurality of components are the same.

22. The kit of claim 1, wherein the first and the second ones of the plurality of components are not the same.

23. The kit of claim 1, wherein the second one of the plurality of components includes a filter.

24. The kit of claim 1, wherein the second one of the plurality of components includes a pump.

25. The kit of claim 1, wherein the second one of the plurality of components includes a refill station adapted to deliver drink fluid to the reservoir through the downstream assembly.

26. The kit of claim 1, further comprising a pack in which the reservoir is housed.

27. The kit of claim 1, in combination with a gas mask having an input tube coupled to the mount of the other of the second one of the male and the female coupling members.

28. The kit of claim 27, wherein at least a substantial portion of the hydration system kit is formed from a chemically resistant material.

* * * * *